United States Patent
Sakata

(10) Patent No.: US 7,305,428 B2
(45) Date of Patent: Dec. 4, 2007

(54) RETRIEVAL DEVICE, RETRIEVAL SERVER, AND RETRIEVAL SYSTEM, AS WELL AS RETRIEVAL METHOD AND COMPUTER PROGRAM WITH GREATER EXTENT OF RETRIEVAL CONDITIONS

(75) Inventor: Kazuhiro Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 647 days.

(21) Appl. No.: 10/123,421

(22) Filed: Apr. 17, 2002

(65) Prior Publication Data

US 2002/0156845 A1    Oct. 24, 2002

(30) Foreign Application Priority Data

Apr. 18, 2001    (JP)    ............................... 2001-119954

(51) Int. Cl.
*G06F 15/16*    (2006.01)
(52) U.S. Cl. ...................... 709/203; 709/200; 709/228
(58) Field of Classification Search .................. 709/203
See application file for complete search history.

(56) References Cited

U.S. PATENT DOCUMENTS

| | | | |
|---|---|---|---|
| 5,493,692 A | | 2/1996 | Theimer et al. |
| 5,920,854 A | * | 7/1999 | Kirsch et al. .................. 707/3 |
| 6,026,400 A | * | 2/2000 | Suzuki ........................... 707/6 |
| 6,202,023 B1 | * | 3/2001 | Hancock et al. ............ 701/201 |
| 6,401,085 B1 | * | 6/2002 | Gershman et al. ............. 707/4 |
| 6,664,922 B1 | * | 12/2003 | Fan ........................ 342/357.1 |
| 6,675,017 B1 | * | 1/2004 | Zellner et al. ......... 379/142.02 |
| 6,799,032 B2 | * | 9/2004 | McDonnell et al. ........ 455/410 |
| 2002/0120370 A1 | * | 8/2002 | Parupudi et al. ................ 701/1 |

FOREIGN PATENT DOCUMENTS

| | | |
|---|---|---|
| EP | 1 081 613 A1 | 3/2001 |
| JP | 63-54670 | 3/1988 |

(Continued)

OTHER PUBLICATIONS

Chinese Office Action dated May 14, 2004, with English translation.

(Continued)

*Primary Examiner*—Rupal Dharia
*Assistant Examiner*—Nicholas R Taylor
(74) *Attorney, Agent, or Firm*—McGinn IP Law Group PLLC

(57) ABSTRACT

A retrieval system includes a retrieval server for providing retrieval service and a retrieval device accessible through a transmission medium by the retrieval server. The retrieval device is configured to modify a first retrieval condition with a first retrieving extent into a second retrieval condition with a second retrieving extent which includes the first retrieving extent and which is greater than the first retrieving extent. The server retrieves first retrieved information under a second retrieval condition. The retrieval device retrieves second retrieved information from the first retrieved information under a first retrieval condition designated by a user. The first retrieval condition includes a first factor in connection with the user's privacy-related information. The first retrieval condition includes a second factor corresponding to the first factor. The second factor has a greater retrieving extent than the first factor for protection of the user's privacy-related information.

61 Claims, 11 Drawing Sheets

FOREIGN PATENT DOCUMENTS

| | | |
|---|---|---|
| JP | 2-189680 | 7/1990 |
| JP | 6-68160 | 3/1994 |
| JP | 6-124309 | 5/1994 |
| JP | 6-203076 | 7/1994 |
| JP | 6-208584 | 7/1994 |
| JP | 9-34914 | 2/1997 |
| JP | 10-261026 | 9/1998 |
| JP | 11-66078 | 3/1999 |
| JP | 11-195029 | 7/1999 |
| JP | 11-259512 | 9/1999 |
| JP | 2000-76280 | 3/2000 |
| JP | 2000-76295 | 3/2000 |
| JP | 2000-222273 | 8/2000 |
| JP | 2000-231569 | 8/2000 |
| JP | 2001-14344 | 1/2001 |

OTHER PUBLICATIONS

Japanese Office Action dated Nov. 30, 2004 with Partial English Translation.

European Search Report dated Feb. 23, 2005.

Simone Fischer-Hubner, et al., "Position paper: Privacy Enhancement in the Mobile Internet", Karlstad University Computer Science Department, Sweden, XP-002268932, Jan. 28, 2004, pp. 1-3.

European Search Report dated Feb. 19, 2004.

Birgit Kreller, et al., "UMTS: A Middleware Architecture and Mobile API Approach", IEEE Personal Communications, vol. 5, No. 2, Apr. 1, 1998, pp. 32-38, XP000751833.

* cited by examiner

FIG. 2

Original Retrieval Conditions
1. position :
    north latitude 35.45729~ north latitude 35.45730
    east longitude 139.67298~ east longitude 139.67299
    4-1-1, Miyazaki, Miyamaeku, Kawasakishi, Kanagawa
2. age :
    28 years old
3. condition for retrieving shop
    restaurant, Japanese restaurant, Italian restaurant
4. condition for retrieving house
    a house rent : JP¥ 20,000 ~ JP¥ 30,000

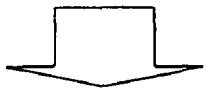

Modified Retrieval Conditions
1. position :
    north latitude 35 ~ north latitude 36
    east longitude 139 ~ east longitude 140
    Kanagawa
2. age :
    20 ~ 30 years old
3. condition for retrieving shop
    restaurant,
5. condition for retrieving house
    a house rent : JP¥ 10,000 ~ JP¥ 100,000

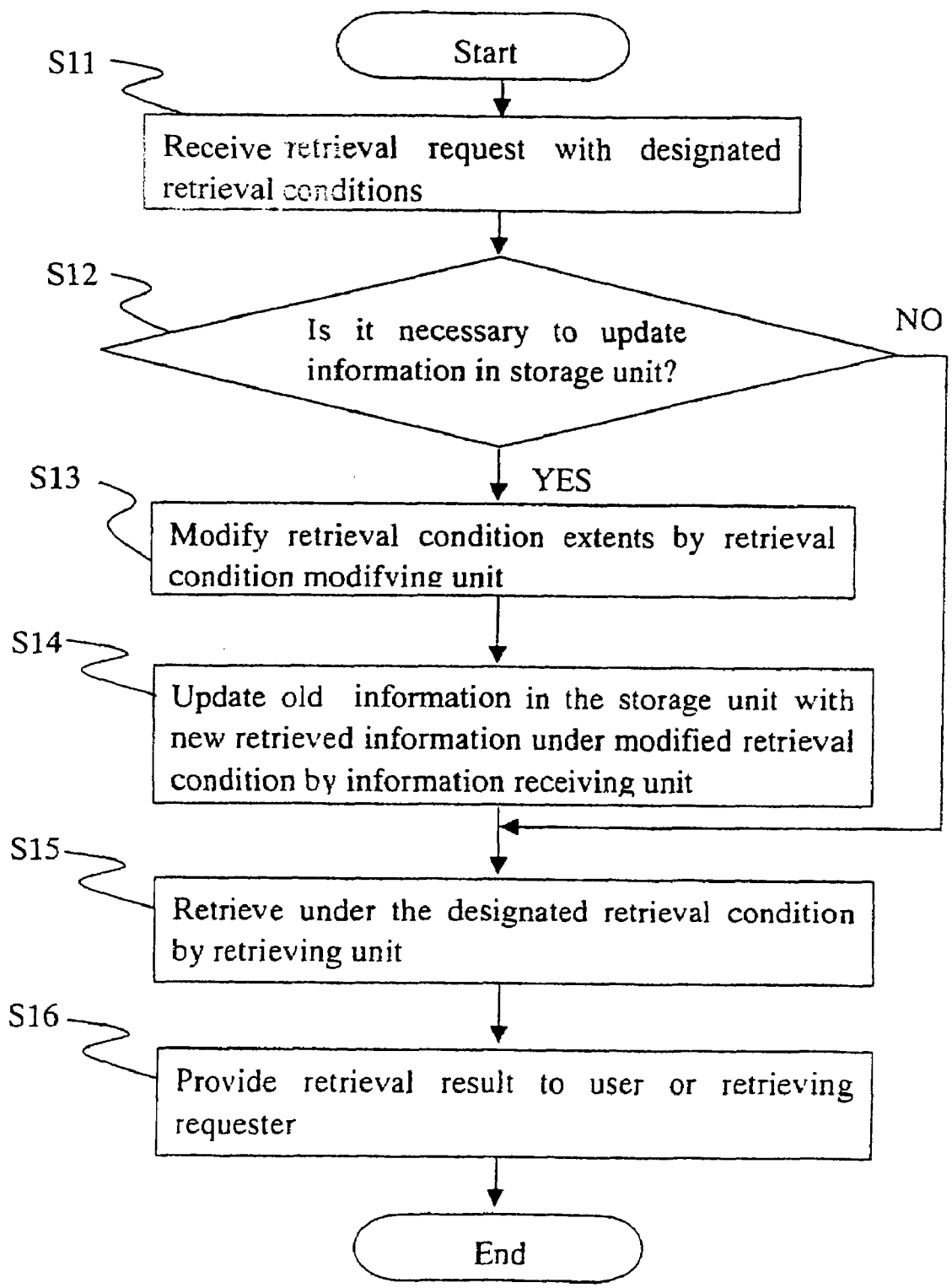

FIG. 4
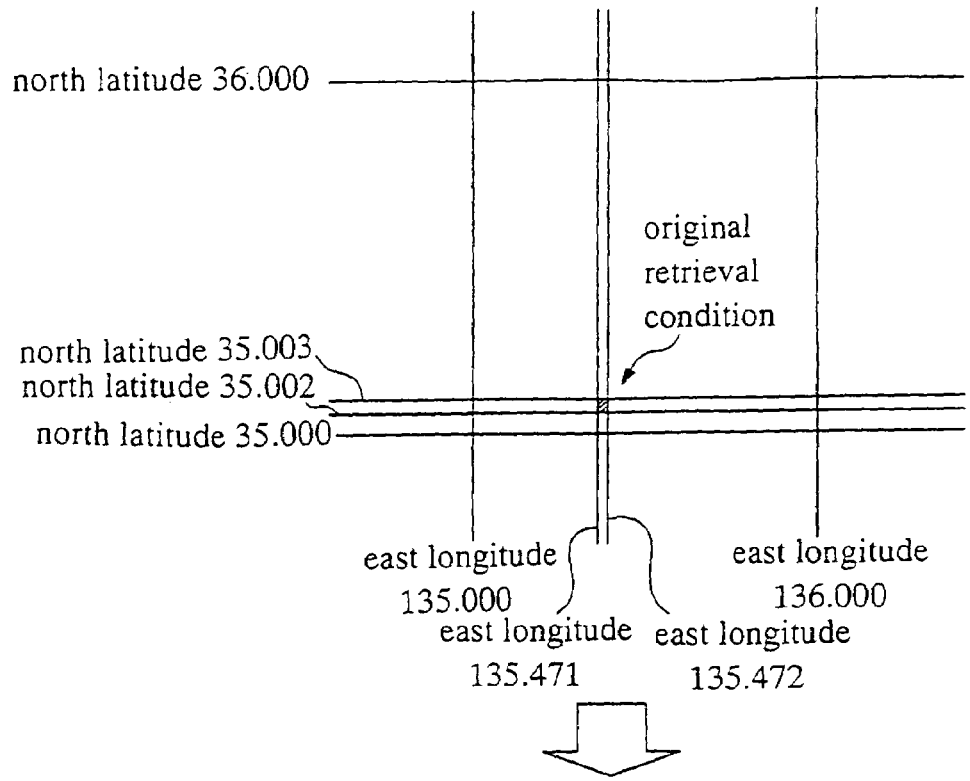
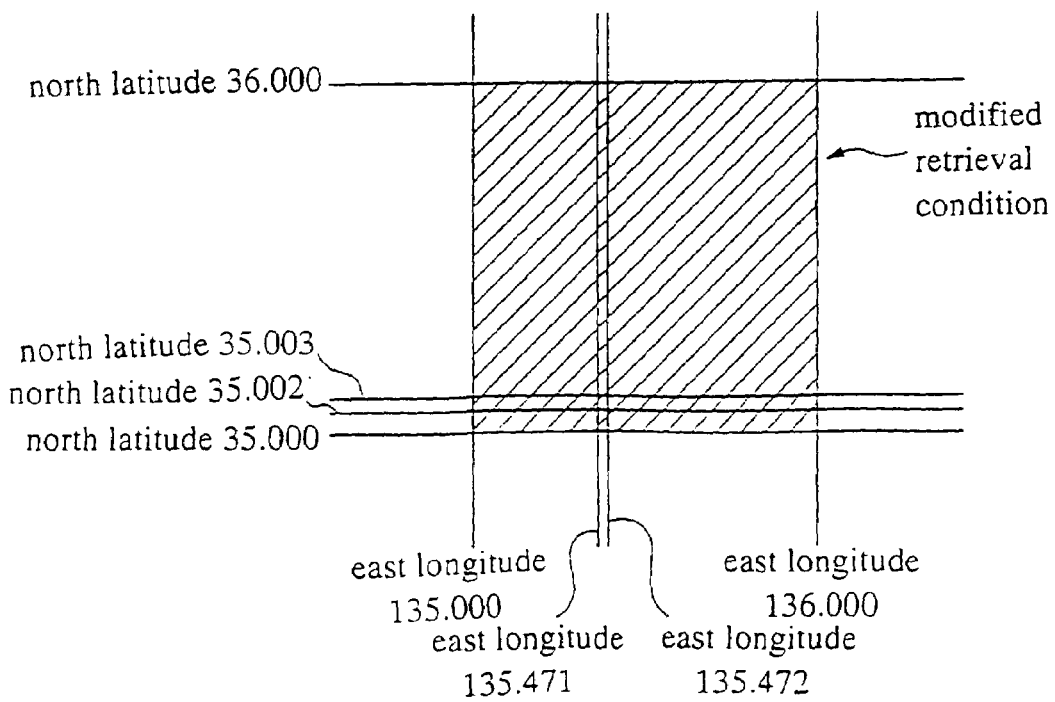

RETRIEVAL DEVICE, RETRIEVAL SERVER, AND RETRIEVAL SYSTEM, AS WELL AS RETRIEVAL METHOD AND COMPUTER PROGRAM WITH GREATER EXTENT OF RETRIEVAL CONDITIONS

BACKGROUND OF THE INVENTION

1. Field of the Invention

The present invention relates to a retrieval device connectable to a network, and a retrieval server for providing retrieval services through the network to the retrieval device, as well as a retrieval system including the retrieval device and the retrieval server, and further relates to a retrieval method and a computer-readable program for implementing the retrieval method.

2. Description of the Related Art

In recent years, various networks such as the Internet have been widely used, and various retrieval services have become available through terminals accessible from the networks. Retrieval conditions, such as one or more key words and update time, are entered by a user into the terminal to define the retrieval conditions for retrieving information on the networks.

Another service utilizing the Global Positioning System has also become available, wherein positional information defined by the Global Positioning System is transmitted to a retrieval server for retrieving available information in the vicinity of the defined position.

As described above, the retrieval system implements retrieval based on the retrieval conditions which have been designated by the user. All of the information about the retrieval conditions is open to a retrieval service provider, even if the information includes private information of the user. However if the security of the retrieval server computer is imperfect, then the information may be leaked to any person.

For example, the retrieval system may provide the user with a location map and shops in the vicinity of the position defined by the user. The positional information is open to the server computer and the retrieval service provider, even if the user intends to keep the positional information confidential.

In order to retrieve residential or housing information, various residential information, such as cost and room size, is also open to the server computer and the retrieval service provider.

In order to retrieve job information, a user's professional experience information or educational background, age, and skill information may also become open.

As described above, the information about the retrieval conditions is open to the retrieval service provider, even if the information includes a user's private information or confidential information. This may allow the user's privacy to be invaded.

In the above circumstances, the development of a novel retrieval device for providing a user with retrieval services, with protection of the user's privacy, is desirable.

Further, the development of a novel retrieval server for providing retrieval services through a network to a retrieval device, with protection of the user's privacy, is desirable.

Furthermore, the development of a novel retrieval system, including a retrieval device and a retrieval server, which is capable of protection of a user's privacy is desirable.

Moreover, the development of a novel retrieval method, and a novel computer-readable program for implementing the retrieval method, with protection of the user's privacy is desirable.

SUMMARY OF THE INVENTION

Accordingly, it is an object of the present invention to provide a novel retrieval device for providing a user with retrieval services free from the above problems.

It is a further object of the present invention to provide a novel retrieval device for providing a user with retrieval services with protection of the user's privacy.

It is a still further object of the present invention to provide a novel retrieval server for providing retrieval services through a network to a retrieval device free from the above problems.

It is yet a further object of the present invention to provide a novel retrieval server for providing retrieval services through a network to a retrieval device with protection of the user's privacy.

It is a yet further object of the present invention to provide a novel retrieval system, including a retrieval device and a retrieval server, which is free from the above problems.

It is moreover an object of the present invention to provide a novel retrieval system, including a retrieval device and a retrieval server, which is capable of protection of the user's privacy.

It is a still more further object of the present invention to provide a novel retrieval method free from the above problems.

It is yet another object of the present invention to provide a novel retrieval method capable of protection of the user's privacy.

It is another object of the present invention to provide a novel computer-readable program for implementing a retrieval method free from the above problems.

It is still another object of the present invention to provide a novel computer-readable program for implementing a retrieval method capable of protection of the user's privacy.

The present invention provides a retrieval system which includes at least one retrieval server for providing retrieval service; and a retrieval device accessible through a transmission medium to the at least one retrieval server. The retrieval device is configured to modify a first retrieval condition with a first retrieving extent or scale into a second retrieval condition with a second retrieving extent scale which includes the first retrieving extent or scale and which is greater than the first retrieving extent or scale. By "extent or scale" is meant the relationship of the retrieval condition to a general description of that condition. As an example, a neighborhood within a city might be the first retrieval condition, while the overall city might be the second retrieval condition. The city has a greater geographical area than the neighborhood. By way of another example, a schedule of airline flights departing between 11:00 a.m. and 1:00 p.m. might be the first retrieval condition, while a schedule of the airline flights departing between 6:00 a.m. and 9:00 p.m. might be the second retrieval condition. The full day schedule has a greater time range than the mid-day schedule. The server retrieves first information under the second retrieval condition. The retrieval device retrieves second information from the first retrieved information under the first retrieval condition designated by a user. The first retrieval condition includes at least a first factor in connection with an user's privacy-related information. The first retrieval condition includes a second factor corresponding to the first factor. The second factor has a greater retrieving extent than the first factor for protection of the user's privacy-related information.

The above and other objects, features and advantages of the present invention will be apparent from the following description.

BRIEF DESCRIPTION OF THE DRAWINGS

Preferred embodiments according to the present invention will be described in detail with reference to the accompanying drawings.

FIG. 2 is a diagram illustrative of an example of the modification operation by the retrieval condition modifying unit from the original retrieval condition into the modified retrieval condition.

FIG. 3 is a flow chart of sequential operations of the retrieval system shown in FIG. 1.

FIG. 4 is a diagram illustrative of the designated extent of the original retrieval condition and the expanded extent of the modified retrieval condition.

DETAILED DESCRIPTION OF THE PREFERRED EMBODIMENTS

Figure 1:
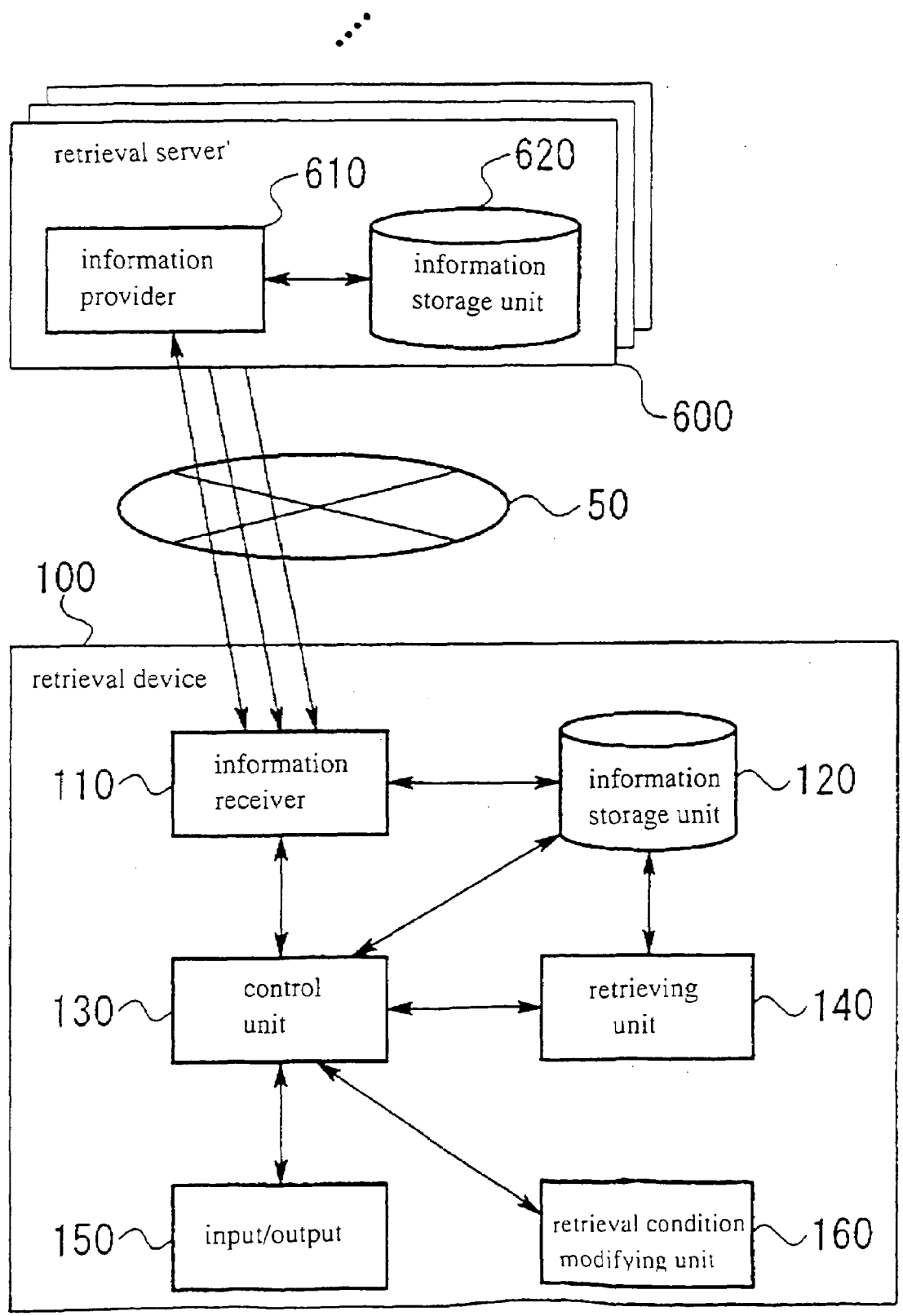
FIG. 1 is a block diagram illustrative of a configuration of a retrieval system in a first embodiment in accordance with the present invention.

A first aspect of the present invention is a retrieval device accessible to at least one retrieval server providing retrieval service. The retrieval device includes a retrieval condition modifying unit for modifying a first retrieval condition with a first retrieving extent into a second retrieval condition with a second retrieving extent which includes the first retrieving extent and which is wider than the first retrieving extent; a retrieval information receiving unit for transmitting the second retrieval condition to the retrieval server and for receiving first retrieved information matched to the second retrieval condition from the retrieval server; and a retrieving unit for retrieving, from the first retrieved information, second retrieved information matched to the first retrieval condition.

It is possible that the first retrieval condition may include at least a first factor in connection with a user's privacy-related information, and the first retrieval condition may include a second factor corresponding to the first factor, and the second factor may have a wider retrieving extent than the first factor.

It is further possible that the retrieval condition modifying unit may be adjusted to modify the first retrieval condition into the second retrieval condition in accordance with a predetermined degree of indistinctness for each kind of the factors of the second retrieval condition, and with a predetermined procedure for modifying the first retrieval condition into the second retrieval condition, and the retrieval condition modifying unit may also be adjusted to maintain the predetermined degree of indistinctness and the predetermined procedure.

It is also possible that the retrieval condition modifying unit may be adjusted to modify the first retrieval condition into the second retrieval condition in accordance with a user-designated degree of indistinctness for each kind of the factors of the second retrieval condition, and with a user-designated procedure for modifying the first retrieval condition into the second retrieval condition.

It is possible to further include a first memory for storing the first retrieval condition entered by the user, wherein the retrieval condition modifying unit is adjusted to fetch the first retrieval condition from the first memory and to modify the first retrieval condition into the second retrieval condition upon receipt of entry of a retrieval request.

It is also possible that the retrieval device may be accessible to an external device, which is capable of generating at least a part of the first retrieval condition, for receiving an entry of at least part of the first retrieval condition from the external device.

It is also possible that the retrieval condition modifying unit may be adjusted to selectively delete each factor of the second retrieval condition upon receipt of entry of a user's instruction.

It is possible to further include a first retrieved information storing unit for storing the first retrieved information and for allowing the retrieving unit to retrieve the second retrieved information from the first retrieved information storing unit.

It is possible to further include a control unit for making a decision to update the first retrieved information stored in the first retrieved information storing unit by verifying whether the first retrieved information stored in the first retrieved information storing unit includes any content in connection with the first retrieval condition.

It is further possible that the control unit may make a decision to update the first retrieved information upon receipt of entry of a retrieval request.

It is also possible that the control unit may automatically make a decision to update the first retrieved information periodically.

It is also possible that the control unit may be adjusted to predict the first retrieval condition to be entered in the future, and may generate a predicted retrieval condition in connection with the first retrieval condition, the retrieval condition modifying unit may modify the predicted retrieval condition into the second retrieval condition, and the retrieval information receiving unit may transmit the second retrieval condition to the retrieval server and may receive the first retrieved information matched to the second retrieval condition from the retrieval server.

It is also possible that the retrieval information receiving unit may transmit the contents of the first retrieved information, stored in the first retrieved information storing unit, in addition to the first retrieval condition, to the retrieval server, and the retrieval information receiving unit may receive differential information in connection with the first retrieved information from the retrieval server for updating the first retrieved information based on the differential information.

It is also possible that the retrieving unit may receive retrieval program data, including a retrieval program, from the retrieval server, and that the retrieving unit may retrieve the second retrieved information in accordance with the retrieval program.

It is also possible that the retrieval device may receive retrieval program data, including a retrieval program, from a retrieval program sever separately from the first retrieved information, and the retrieving unit may retrieve the second retrieved information in accordance with the retrieval program.

It is possible to further include an input/output unit connectable through a wireless network to an extended client operable by a user.

It is further possible that the extended client may comprise a mobile terminal.

It is possible that the retrieval information receiving unit may receive, from the retrieval server, pointer information in connection with the first retrieved information, and the retrieving unit may retrieve condition-matched pointer information, which is matched to the first retrieval condition, from the pointer information.

It is further possible that the retrieval information receiving unit may receive from the retrieval server, a retrieval program in addition to the condition-matched pointer information, and that the retrieving unit may retrieve the condition-matched pointer information in accordance with the retrieval program.

It is possible to further include a selector for selecting an item of pointer information from all the pointer information in accordance with a user's instruction, wherein the retrieval information receiving unit transmits, to the retrieval server, the selected pointer information and a request for full information in connection with the selected pointer information.

It is further possible that the retrieval information receiving unit may transmit at least one item of non-requested dummy pointer information in addition to the selected pointer information, and a request for full information in connection with both the selected pointer information and the non-requested dummy pointer information.

It is possible to further include a selector for selecting an item of pointer information from all the pointer information in accordance with a user's instruction, wherein the retrieval information receiving unit transmits, to a server other than the retrieval server, the selected item of pointer information and a request for full information in connection with the selected pointer information, where the other server maintains the full information in connection with the selected pointer information.

It is further possible that the retrieval information receiving unit may transmit at least one item of non-requested dummy pointer information in addition to the selected pointer information and a request for full information in connection with both the selected pointer information and the non-requested dummy pointer information.

A second aspect of the present invention is a retrieval condition generator including a receiver for receiving a first retrieval condition with a first retrieving extent, and a modifier for modifying the first retrieval condition into a second retrieval condition with a second retrieving extent which includes the first retrieving extent and which is wider than the first retrieving extent, wherein the second retrieval condition is to obtain first retrieved information, and the first retrieval condition is designated by the user to retrieve second retrieved information, which is desired by the user, from the first retrieved information.

It is further possible that the first retrieval condition may include at least a first factor in connection with a user's privacy-related information, and the first retrieval condition may include a second factor corresponding to the first factor, and the second factor may have a wider retrieving extent than the first factor.

It is also possible that the receiver and the modifier may be incorporated in a retrieval device accessible by at least one retrieval server providing retrieval service, the retrieval server may retrieve the first retrieved information based on the second retrieval condition, and the retrieval device may retrieve the second retrieved information from the first retrieved information based on the first retrieval condition.

It is also possible that the modifier may further comprise hardware for modifying the first retrieval condition into the second retrieval condition.

It is also possible that the modifier may further comprise a memory for storing a modifying program, and a processor for executing the modifying program to modify the first retrieval condition into the second retrieval condition.

A third aspect of the present invention is a retrieval server for providing retrieval service to at least a retrieval device which is accessible to the retrieval server. The retrieval server may include a retrieval information providing unit for providing the retrieval device with first retrieved information, which is matched to a second retrieval condition, and a retrieval program to the retrieval device, wherein the retrieval program is executed by the retrieval device for retrieving second retrieved information, which is matched to a first retrieval condition designated by the user, and the first retrieval condition has a first retrieving extent, and the second retrieval condition has a second retrieving extent which includes the first retrieving extent and which is wider than the first retrieving extent.

It is possible to further include a retrieval program storing unit for storing the retrieval program.

It is possible to further include a pointer information generating unit for generating pointer information in connection with the first retrieved information, wherein the retrieval information providing unit provides the retrieval device with the pointer information, and the retrieval device retrieves condition-matched pointer information from the provided pointer information.

A fourth aspect of the present invention is a retrieval system including at least a retrieval server for providing retrieval service, a retrieval device accessible through a transmission medium to the retrieval server, the retrieval device further including, a retrieval condition modifying unit for modifying a first retrieval condition with a first retrieving extent into a second retrieval condition with a second retrieving extent which includes the first retrieving extent and which is greater than the first retrieving extent, a retrieval information receiving unit for transmitting the second retrieval condition to the retrieval server to allow the retrieval server to retrieve first retrieved information which is matched to the second retrieval condition, a retrieval information receiving unit for receiving the first retrieved information from the retrieval server, and a retrieving unit for retrieving second retrieved information matched to the first retrieval condition from the first retrieved information.

It is also possible that the first retrieval condition may include at least a first factor in connection with a user's privacy-related information, and the first retrieval condition may include a second factor corresponding to the first factor, and the second factor has a wider retrieving extent than the first factor.

It is also possible that the retrieval condition modifying unit may be adjusted to modify the first retrieval condition into the second retrieval condition in accordance with a predetermined degree of indistinctness for each kind of the factors of the second retrieval condition, and with a predetermined procedure for modifying the first retrieval condition into the second retrieval condition, and the retrieval condition modifying unit may also be adjusted to maintain the predetermined degree of indistinctness and the predetermined procedure.

It is also possible that the retrieval condition modifying unit may be adjusted to modify the first retrieval condition into the second retrieval condition in accordance with a user-designated degree of indistinctness for each kind of the factors of the second retrieval condition, and with a user-designated procedure for modifying the first retrieval condition into the second retrieval condition.

It is also possible that the retrieval device further may include a first memory for storing the first retrieval condition entered by the user, and the retrieval condition modifying unit may be adjusted to fetch the first retrieval condition from the first memory and to modify the first retrieval condition into the second retrieval condition upon receipt of an entry of a retrieval request.

It is also possible that the retrieval device may be accessible to an external device, which is capable of generating at least a part of the first retrieval condition, for receiving an entry of the at least a part of the first retrieval condition from the external device.

It is also possible that the retrieval condition modifying unit may be adjusted to selectively delete each factor of the second retrieval condition upon receipt of an entry of a user's instruction.

It is also possible that the retrieval device further may include a first retrieved information storing unit for storing the first retrieved information and for allowing the retrieving unit to retrieve the second retrieved information from the first retrieved information storing unit.

It is possible that the retrieval device further may include a control unit for making a decision to update the first retrieved information stored in the first retrieved information storing unit by verifying whether the first retrieved information stored in the first retrieved information storing unit includes any content in connection with the first retrieval condition.

It is also possible that the control unit may make a decision to update the first retrieved information upon receipt of an entry of a retrieval request.

It is possible that the control unit may automatically make a decision to update the first retrieved information periodically.

It is possible that the control unit may be adjusted to predict the first retrieval condition to be entered in the future, and may generate a predicted retrieval condition in connection with the first retrieval condition, the retrieval condition modifying unit may modify the predicted retrieval condition into the second retrieval condition, and the retrieval information receiving unit may transmit the second retrieval condition to the retrieval server and may receive the first retrieved information matched to the second retrieval condition from the retrieval server.

It is also possible that the retrieval information receiving unit may transmit contents of the first retrieved information stored in the first retrieved information storing unit in addition to the first retrieval condition to the retrieval server, and the retrieval information receiving unit may receive differential information in connection with the first retrieved information from the retrieval server for updating the first retrieved information based on the differential information.

It is possible that the retrieval server may provide the retrieval device unit with retrieval program data, including a retrieval program, and the retrieving unit may retrieve the second retrieved information in accordance with the retrieval program.

It is possible that the retrieval device may receive retrieval program data, including a retrieval program, from a retrieval program server separately from the first retrieved information, and the retrieving unit may retrieve the second retrieved information in accordance with the retrieval program.

It is possible that the retrieval device further may include an input/output unit connectable through a wireless network to an extended client operable by a user.

It is further possible that the extended client may comprise a mobile terminal.

It is also possible that the retrieval server further may include a pointer information generating unit for generating pointer information in connection with the first retrieved information, and the retrieval information receiving unit may receive, from the retrieval server, the pointer information, and the retrieving unit may retrieve condition-matched pointer information, which is matched to the first retrieval condition, from the received pointer information.

It is further possible that the retrieval information receiving unit may receive, from the retrieval server, a retrieval program in addition to the condition-matched pointer information, and the retrieving unit may retrieve the condition-matched pointer information in accordance with the retrieval program.

It is also possible that the retrieval device further may include a selector for selecting pointer information in accordance with a user's instruction, wherein the retrieval information receiving unit transmits, to the retrieval server, the selected pointer information and a request for full information in connection with the selected pointer information.

It is also possible that the retrieval information receiving unit may transmit at least one item of non-requested dummy pointer information, in addition to the selected pointer information, and a request for full information in connection with both the selected pointer information and the non-requested dummy pointer information.

It is also possible that the retrieval device further may include a selector for selecting pointer information in accordance with a user's instruction, wherein the retrieval information receiving unit transmits, to a server other than the retrieval server, the selected pointer information and a request for full information in connection with the selected pointer information, where the other server maintains the full information in connection with the selected pointer information.

It is also possible that the retrieval server further may include a retrieval program storing unit for storing the retrieval program.

It is also possible that the retrieval server further may include a pointer information generating unit for generating pointer information in connection with the first retrieved information, wherein the retrieval information providing unit provides the retrieval device with the pointer information, and the retrieval device retrieves a condition-matched pointer information from the provided pointer information.

A fifth aspect of the present invention is a retrieval method for retrieving information from a retrieval server for serving which provides retrieval service to a retrieval device accessible through a transmission medium by the retrieval server. The method comprises modifying a first retrieval condition with a first retrieving extent into a second retrieval condition with a second retrieving extent which includes the first retrieving extent and which is greater than the first retrieving extent, transmitting the second retrieval condition to the retrieval server to allow the retrieval server to retrieve first retrieved information which is matched to the second retrieval condition, and retrieving second retrieved information matched to the first retrieval condition from the first retrieved information from the retrieval server.

It is possible that the first retrieval condition may include a first factor in connection with a user's privacy-related information, and a second factor corresponding to the first factor, and the second factor may have a greater retrieving extent than the first factor.

It is further possible that the first retrieval condition may be modified into the second retrieval condition in accordance with a predetermined degree of indistinctness for each kind of the factors of the second retrieval condition, and with a predetermined procedure for modifying the first retrieval condition into the second retrieval condition.

It is also possible that the first retrieval condition may be modified into the second retrieval condition in accordance with a user-designated degree of indistinctness for each kind of the factors of the second retrieval condition, and with a user-designated procedure for modifying the first retrieval condition into the second retrieval condition.

It is also possible that the first retrieval condition, past-entered by user, may be fetched from a memory and modified into the second retrieval condition upon receipt of an entry of a retrieval request.

It is also possible that each factor of the second retrieval condition may be selectively deleted upon receipt of an entry of a user's instruction.

It is possible to further include making a decision to update the first retrieved information by verifying whether the first retrieved information includes any content in connection with the first retrieval condition.

It is further possible that the decision to update the first retrieved information may be made upon receipt of an entry of a retrieval request.

It is further possible that the decision to update the first retrieved information may be made automatically and periodically.

It is also possible to further include making a prediction of the first retrieval condition to be entered by user in the future for generating a predicted retrieval condition in connection with the first retrieval condition, and modifying the predicted retrieval condition into the second retrieval condition.

It is possible to further include transmitting contents of the first retrieved information to the retrieval server in addition to the first retrieval condition, receiving differential information in connection with the first retrieved information from the retrieval server, and updating the first retrieved information based on the differential information.

It is also possible that the second retrieved information may be retrieved in accordance with a retrieval program.

It is also possible to further include receiving retrieval program data including a retrieval program from a retrieval program server separately from the first retrieved information, and retrieving the second retrieved information in accordance with the retrieval program.

It is also possible to further include generating pointer information in connection with the first retrieved information, and retrieving condition-matched pointer information, which is matched to the first retrieval condition, from the generated pointer information.

It is possible to further include selecting pointer information from the retrieved pointer information in accordance with a user's instruction, and transmitting, to the retrieval server, the selected pointer information and a request for full information in connection with the selected pointer information.

It is possible to further include transmitting, to the retrieval server, at least one non-requested dummy pointer information, in addition to the selected pointer information, and a request for full information in connection with both the selected pointer information and the non-requested dummy pointer information.

It is possible to further include selecting pointer information in accordance with a user's instruction, and transmitting, to a server other than the retrieval server, the selected pointer information and a request for full information in connection with the selected pointer information, where the other server maintains the full information in connection with the selected pointer information.

It is possible to further include transmitting, to another server, at least one item of non-requested dummy pointer information, in addition to selected pointer information, and a request for full information in connection with both the selected pointer information and the non-requested dummy pointer information.

A sixth aspect of the present invention is a computer program to be executed by a computer for implementing the retrieval method described above.

First Embodiment

A first embodiment according to the present invention will be described in detail with reference to the drawings. FIG. 1 is a block diagram illustrative of an entire configuration of a retrieval system including a retrieval server and a retrieval device, connectable through a network to the retrieval server in this first embodiment in accordance with the present invention. The retrieval system includes a retrieval server 600, a communication network 50 and a retrieval device 100 connectable through the communication network 50 to the retrieval server 600.

The retrieval server 600 further includes a retrieval information providing unit 610 and an information storing unit 620. The information storing unit 620 stores information which is available to users. The retrieval information providing unit 610 retrieves information stored in the information storing unit 620 in accordance with a retrieval request transmitted from the retrieval device 100 through the communication network 50, and outputs a retrieval result which is then transmitted through the communication network 50 to the retrieval device 100.

The retrieval server 600 may include a plurality of servers, which respectively provide map information, residential information, job information, shop information, timetable information, goods-prices information, book information, Web-contents information, and combinations thereof.

The retrieval device 100 transmits the retrieval request through the communication network 50 to the retrieval server 600. The retrieval device 100 also receives the retrieval result transmitted from the retrieval server 600 through the communication network 50. The retrieval device 100 may optionally comprise any available terminal devices connectable through the communication network 50 to the retrieval server 600, such as a personal computer and a mobile terminal. The communication network 50 may comprise any available communication network such as the Internet.

The retrieval device 100 includes a retrieval information receiving unit 110, a retrieval information storing unit 120, a control unit 130, a retrieving unit 140, an input/output unit 150 and a retrieval condition modifying unit 160.

The input/output unit 150 receives the retrieval condition entered by the user. The input/output unit 150 also outputs signals representing the retrieval result.

The retrieval condition modifying unit 160 modifies the original retrieval condition into a modified retrieval condition. The original retrieval condition is identical with the retrieval condition which has been entered by the user through the input/output unit 150. The modified retrieval condition is a retrieval condition which has been obtained by making the original retrieval condition indistinctive, or by making the extent of the original retrieval condition greater, so that the modified retrieval condition is greater and more indistinctive than the original retrieval condition. The original retrieval condition will hereinafter be referred to as a first retrieval condition. The modified retrieval condition will hereinafter be referred to as a second retrieval condition. The modified retrieval condition is generated by the retrieval condition modifying unit 160 based on the original retrieval condition which has been entered by the user through the input/output unit 150.

The retrieval information receiving unit 110 transmits the retrieval request together with the modified retrieval condition through the communication network 50 to the retrieval server 600, so that the retrieval server 600 retrieves information in accordance with the retrieval request under the modified retrieval condition. The retrieval server 600 transmits an indistinctive-retrieval result, including indistinctive-condition-matched information, which is matched to the modified retrieval condition, through the communication network 50 to the retrieval device 100. The retrieval information receiving unit 110 receives the indistinctive-retrieval result including the indistinctive-condition-matched information from the retrieval server 600. The indistinctive-retrieval result including the indistinctive-condition-matched information will hereinafter be referred to as a first retrieval result.

The retrieval information storing unit 120 receives the first retrieval result from the retrieval information receiving unit 110 and stores the first retrieval result. The control unit 130 controls respective operations of the retrieval information receiving unit 110, the retrieval information storing unit 120, the control unit 130, the retrieving unit 140, the input/output unit 150, and the retrieval condition modifying unit 160.

The retrieving unit 140 retrieves original-condition-matched information from the indistinctive-condition-matched information included in the indistinctive-retrieval result and stored in the retrieval information storing unit 120 under the original retrieval condition which has been entered by the user, provided that the original-condition-matched information is matched to the original retrieval condition. The original-condition-matched information is outputted through the input/output unit 150 as a second retrieval result. The original-condition-matched information is also stored in the retrieval information storing unit 120.

The retrieval information storing unit 120 thus stores both the first and second retrieval results, wherein each of the retrieval results is allocated with an identification which identifies the obtained information. In connection with the identification, the times when the obtained information, the retrieval condition and the obtained information are stored in the retrieval information storing unit 120.

One example of the modification operation by the retrieval condition modifying unit 160 from the original retrieval condition into the modified retrieval condition will subsequently be described. FIG. 2 is illustrative of an example of the modification operation by the retrieval condition modifying unit from the original retrieval condition into the modified retrieval condition. The original retrieval condition distinctively represents privacy-related information. In order to protect the user's privacy-related information, the retrieval condition modifying unit 160 modifies the original retrieval condition into the modified retrieval condition which, however, indistinctively represents the user's privacy-related information, wherein the modified retrieval condition is greater and more indistinctive than the original retrieval condition.

The degree of indistinctness of the privacy-related information on the modified retrieval condition may optionally be designated by either the retrieval system or the user. If the retrieval system designates the degree of indistinctness, then a method of modifying the original retrieval condition into the modified retrieval condition depends upon the contents of the original retrieval condition and/or description formats. The modified retrieval condition may usually comprise plural kinds of factors. The retrieval condition modifying unit 160 manages the procedures of making respective extents of plural kind factors of the modified retrieval condition greater and of making indistinctive the plural kind factors of the modified retrieval condition, as well as manages respective degrees of indistinctness of the plural kind factors of the modified retrieval condition. Based on the managed procedures and degrees of indistinctness, the retrieval condition modifying unit 160 implements the above-described modification operation.

In place of the retrieval system, the user may designate the degree of indistinctness of the modified retrieval condition along with the entry of respective factors of the original retrieval condition. Alternatively, one or more users may have previously entered respective degrees of indistinctness of the privacy-related information on the modified retrieval conditions and stored the same into either the retrieval information storing unit 120 or another storing unit, so that the retrieval system refers to the user-designated degree of indistinctness of the modified retrieval condition for implementation of the above-described modification operation.

The retrieval system may optionally be adjusted to allow the user to select, in his or her discretion, one or more privacy-related modifying-requested factors of the original retrieval condition and also one or more privacy-related deleting-requested factors of the original retrieval condition, whereby the retrieval condition modifying unit 160 selectively modifies the privacy-related modifying-requested factors only and deletes the privacy-related deleting-requested factors, whilst the retrieval condition modifying unit 160 does not modify the remaining privacy-unrelated factors of the original retrieval condition.

The privacy-related modifying-requested factor of the original retrieval condition is a factor that the user wishes or intends to modify or make indistinctive, so that the modified factor does not represent the privacy information distinctively. The privacy-related deleting-requested factor of the original retrieval condition is a factor that the user wishes or intends to delete for protection of the privacy, because the user considers that even if the factor has been full-modified, then the full-modified factor still represents the privacy information distinctively. For complete protection of the privacy, it is necessary to delete the privacy-related deleting-requested factor of the original retrieval condition.

The operation of the above-described novel retrieval system will be described by taking a map-information retrieval service as one example with reference again to FIG. 1.

The retrieval server 600 provides map information. The information storing unit 620 stores predetermined map information. The retrieval information providing unit 610 retrieves retrieval-condition-matched map information from the predetermined map information stored in the information storing unit 620 based on a designated retrieval condition, wherein the retrieval-condition-matched map information matches the designated retrieval condition. The retrieval information providing unit 610 outputs the retrieval-condition-matched map information. The retrieval information providing unit 610 decides how to designate the retrieval condition based on the kinds, formats and usage of the map information.

In this embodiment, a rectangle region defined by a designated latitude and a designated longitude is the retrieval condition. The retrieval information providing unit 610 retrieves the retrieval-condition-matched map information from the predetermined map information stored in the information storing unit 620 based on the rectangle region defined by the designated latitude and the designated longitude, and outputs the retrieval-condition-matched map information.

It is assumed that if the current position of the user is represented in a wide rectangle region defined by a latitude range of 1.000 degree and a longitude range of 1.000 degree, then the user considers that the original retrieval condition as entered is represented indistinctively, and his or her privacy can be protected. If, however, the current position of the user is represented in a much narrower rectangle region than the above wide rectangle region, then the user considers that the original retrieval condition as entered is represented distinctively and his or her privacy can not be protected.

Under the above-described assumption, an example of the operations by the retrieval system in this first embodiment will be described with reference to FIGS. 1 and 3. FIG. 3 is a flow chart of sequential operations of the retrieval system shown in FIG. 1. The user designates, as the retrieval conditions, a rectangle region defined by a north latitude range of 35.002 degrees to 35.003 degrees and an east longitude range of 135.471 degrees to 135.472 degrees.

In the first step S11, the retrieval request with the designated extent of the original retrieval condition are entered by the user into the input/output unit 150. Alternatively, the retrieval request with the designated extent of the original retrieval condition may also be entered into the input/output unit 150 via an external device. Further alternatively, it is possible to use the extent of the original retrieval condition which has already been stored in the memory. Moreover, it is possible that the original retrieval condition is generated by an additional device.

For example, it is convenient for the user that unchangeable information, such as the user's name and address, have previously been stored in the memory to avoid the user's frequent entry processes for entering the unchangeable information every time. It is also convenient for the user that the positional information is automatically entered from a position-detector such as a Global Positioning System for avoiding the user's frequent entry processes for entering the current position every time.

If a plurality of the retrieval servers 600 are available to the retrieval device 100, then a server-identification information, which identifies the access-requested one of the plural servers 600, is also entered, together with the above-described retrieval request and the original retrieval conditions. URL is one example of the available server-identification information.

In the second step S12, the control unit 130 judges whether or not it is necessary to update the retrieval result information stored in the retrieval information storing unit 120 based on the designated extent of the original retrieval condition and the contents of the retrieval result information stored in the retrieval information storing unit 120.

For example, the control unit 130 verifies whether or not the retrieval information storing unit 120 has already stored information which is matched to the designated extent of the original retrieval condition.

If the control unit 130 verifies that information stored in the retrieval information storing unit 120 does not include information matched to the original retrieval condition, then the control unit 130 recognizes it to be necessary to update the information stored in the retrieval information storing unit 120. The control unit 130 also refers to time information accompanying the retrieval result which has been stored in the retrieval information storing unit 120, wherein the time information indicates the time when the retrieval information storing unit 120 obtained the retrieval result.

The control unit 130 verifies whether or not the referred retrieval result obtaining time is within a predetermined time period. If the referred retrieval result obtaining time is beyond the predetermined time period, then the control unit 130 recognizes it to be necessary to update the information stored in the retrieval information storing unit 120. The predetermined time period may optionally be designated by the user.

If the control unit 130 recognizes it to be unnecessary to update the information stored in the retrieval information storing unit 120, then the process enters the below-described step S115. If the control unit 130 recognizes it to be necessary to update the information stored in the retrieval information storing unit 120, then the process enters into the following step S113.

In the third step S13, the control unit 130 instructs the retrieval condition modifying unit 160 to modify the original retrieval condition or to change the designated extent of the original retrieval condition. For example, the retrieval condition modifying unit 160 makes greater the latitude and longitude ranges respectively. FIG. 4 is a diagram illustrative of the designated extent of the original retrieval condition and the expanded extent of the modified retrieval condition.

The user has originally designated the north latitude range of 35.002 to 35.003, and the east longitude range of 135.471 to 135.472. The original rectangle region defined by the user's designated extent in latitude and longitude of the original retrieval condition has a narrow hatched-region. In accordance with the instruction from the control unit 130, the retrieval condition modifying unit 160 expands the narrow original rectangle region into a widely-modified rectangle region which is defined by an expanded north latitude range of 35.000 to 36.000, and an expanded east longitude range of 135.000 to 136.000. As a result, the modified retrieval condition is generated by the retrieval condition modifying unit 160.

The expanded north latitude and east longitude ranges are decided by the user's discretion or in the user's viewpoint of whether the widely-modified rectangle region represents the user's current-positional information indistinctively, whereby the user's privacy can be protected.

In the fourth step S14, the control unit 130 instructs the retrieval information receiving unit 110 to transmit the modified retrieval condition together with the retrieval request through the communication network 50 to the retrieval server 600. The retrieval information providing unit 610 retrieves retrieval-condition-matched map information from the information stored in the information storing unit 620, wherein the retrieval-condition-matched map information is matched to the modified retrieval condition. The retrieval information providing unit 610 transmits the retrieved map information as the retrieval result through the communication network 50 to the retrieval device 100.

The retrieval information receiving unit 110 receives the retrieved map information. The control unit 130 instructs the retrieval information receiving unit 110 to send the retrieved map information to the retrieval information storing unit 120. The control unit 130 instructs the retrieval information storing unit 120 to store the retrieved map information. If the old map information still remains stored in the retrieval information storing unit 120, then the retrieval information storing unit 120 updates the map information with the newly retrieved map information. The retrieval information storing unit 120 also stores the information-obtaining time and the modified retrieval condition, together with the map information.

As the results, the retrieval information storing unit 120 could obtain the new map information which is matched to the modified retrieval condition which comprises the widely-modified rectangle region which is defined by the expanded north latitude range of 35.000 to 36.000, and the expanded east longitude range of 135.000 to 136.000. As described above, the retrieval server 600 received only the modified retrieval condition, which represents the user's current positional information indistinctively but did not receive the original retrieval condition, which represents the user's current positional information distinctively, so that the user's privacy in connection with the user's current position could be protected.

In the fifth step S15, the control unit 130 instructs the retrieving unit 140 to retrieve the user's requested map information from the wide map information matched to the modified retrieval condition and stored in the retrieval information storing unit 120, wherein the user's requested map information is matched to the original retrieval condition comprising the original narrow rectangle region defined by the originally designated north latitude and east longitude ranges. Namely, the retrieving unit 140 outputs, as the retrieval result, the user's requested map information of the original narrow rectangle region defined by the originally designated north latitude range of 35.002 to 35.003, and east longitude range of 135.471 to 135.472.

In the sixth step S16, the control unit 130 instructs the input/output unit 150 to output, as the retrieval result, the user's requested map information of the original narrow rectangle region defined by the originally designated north latitude range of 35.002 to 35.003, and east longitude range of 135.471 to 135.472.

Accordingly, the above retrieval system allows the user to obtain the user's requested information matched to the original retrieval condition designated or entered by the user, whilst the user's privacy-related information is protected, because the retrieval server 600 receives only the modified retrieval condition which represents the user's privacy-related information indistinctively, but did not receive the original retrieval condition.

Second Embodiment

Figure 5:
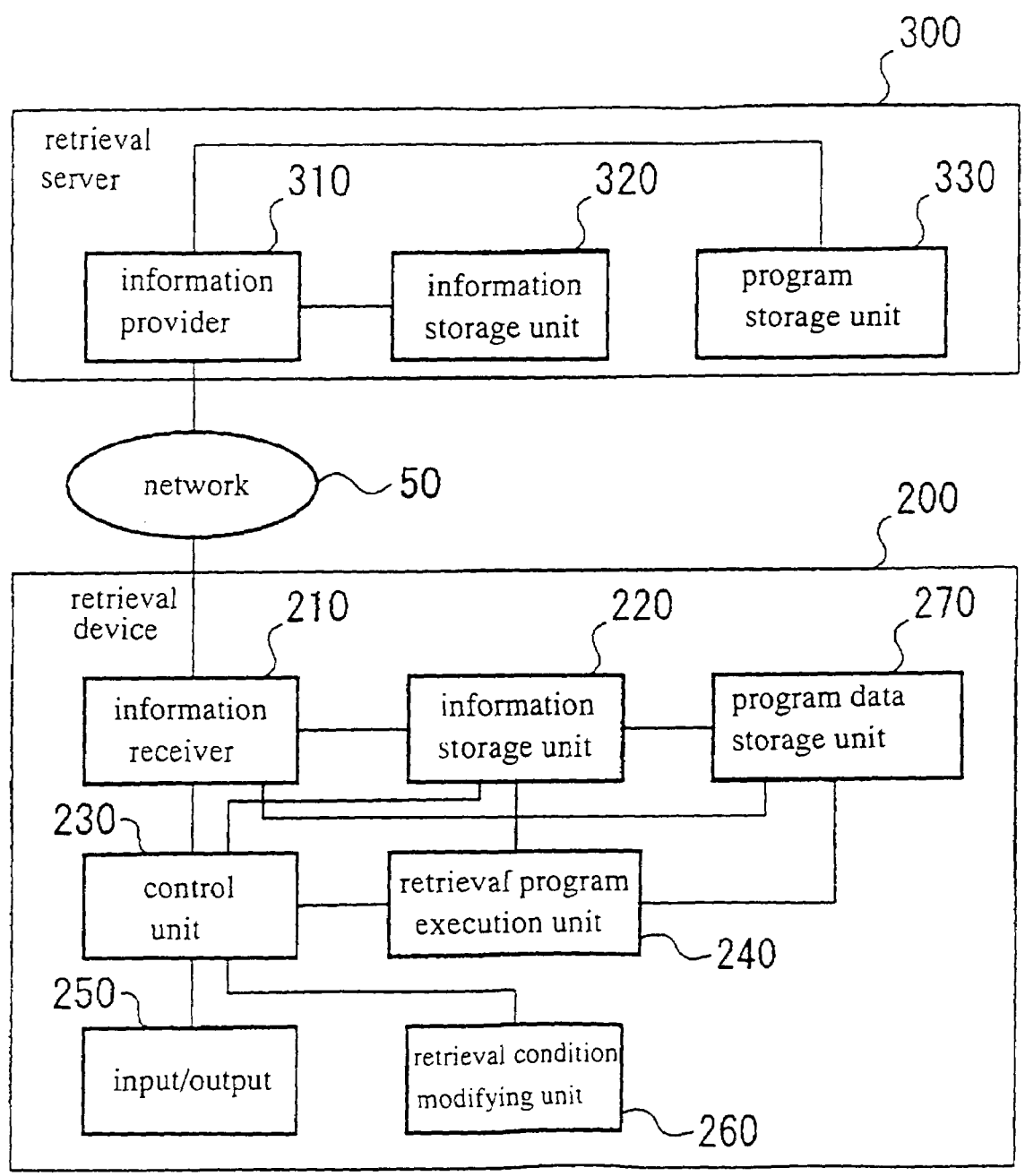
FIG. 5 is a block diagram illustrative of a configuration of a retrieval system in a second embodiment in accordance with the present invention.

A second embodiment according to the present invention will be described in detail with reference to the drawings. FIG. 5 is a block diagram illustrative of an entire configuration of a retrieval system, including a retrieval server and a retrieval device connectable through a network to the retrieval server in a second embodiment. The retrieval system includes a retrieval server 300, a communication network 50 and a retrieval device 200 connectable through the communication network 50 to the retrieval server 300.

The retrieval system of this second embodiment is different from the retrieval system of the above-described first embodiment in that the retrieval device 200 implements the retrieval process in accordance with retrieval program data.

In accordance with the above-described first embodiment, the retrieving unit 140 has access to the retrieval information storing unit 120 for implementing the retrieval process under the original retrieval condition. In case, however, the retrieval device 100 may send different retrieval requests to different plural servers 600 and receive different kinds of the retrieved information from the different plural servers 600. The retrieval device 100 stores the different kinds of retrieved information. The retrieving unit 140 implements different retrieval operations based on the different kinds of retrieved information stored in the retrieval information storing unit 120 under the different kinds of the retrieval conditions and in accordance with the different retrieval procedures and the different algorithms. It is, therefore, inconvenient for the retrieving unit 140 to have all of the necessary functions for performing the different retrieval operations under the different kinds of retrieval conditions and in accordance with the different retrieval procedures and the different algorithms.

In this second embodiment, the retrieval system allows the retrieval device 200 to execute the retrieval program. The retrieval device 200 implements the different plural retrieval operations under the different kinds of the retrieval conditions and in accordance with the different retrieval procedures and the different algorithms.

Figure 6:
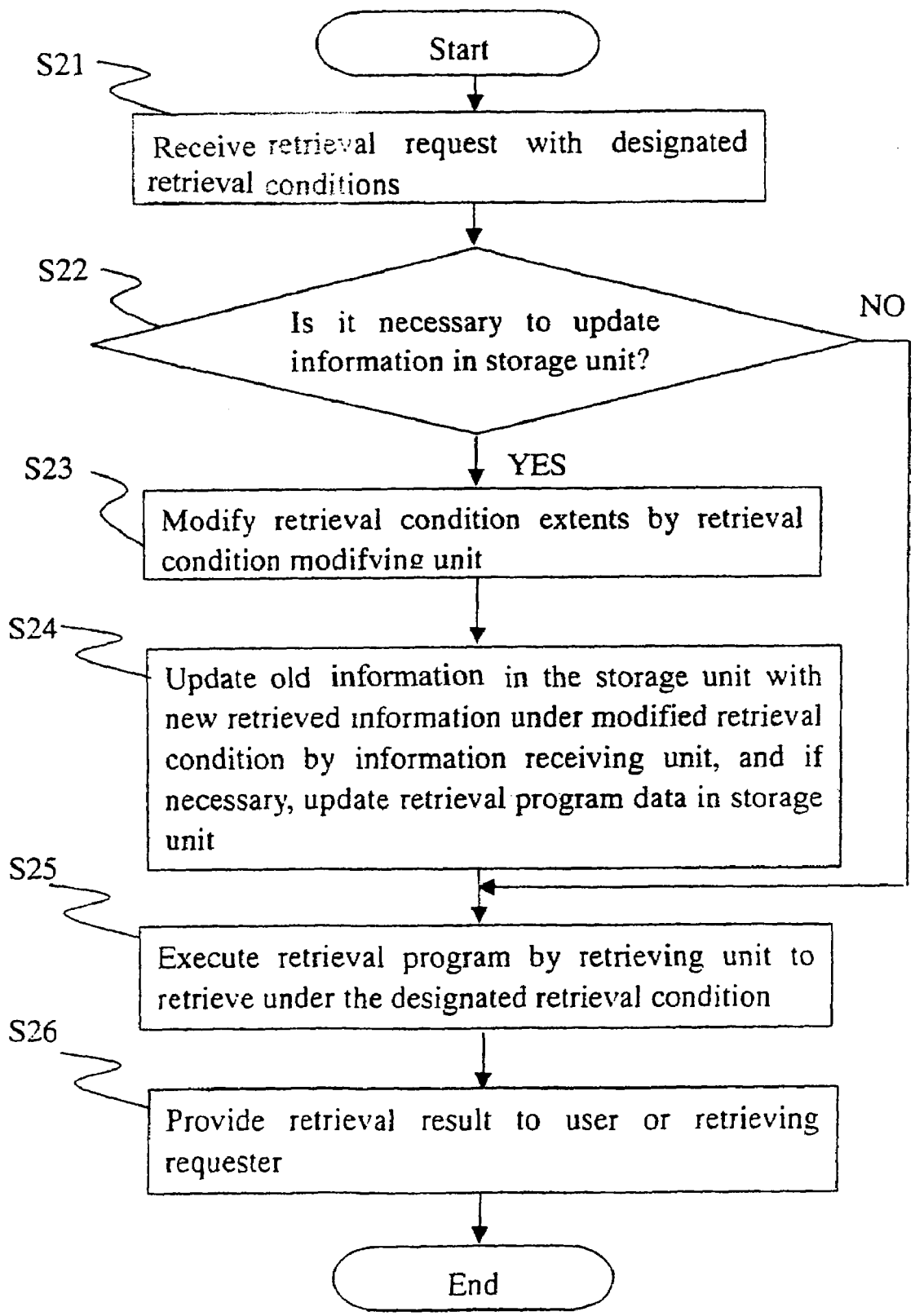
FIG. 6 is a flow chart of sequential operations of the retrieval system shown in FIG. 5.

The detailed description of the configuration of the retrieval system and operations thereof will be made as follows with reference to FIGS. 5 and 6.

The retrieval server 300 includes a retrieval information providing unit 310, an information storing unit 320, and a retrieval program storing unit 330. The retrieval program storing unit 330 stores a retrieval program. The information storing unit 320 stores information which is available to users. The retrieval information providing unit 310 retrieves the information stored in the information storing unit 320 in accordance with a retrieval request transmitted from the retrieval device 200 through the communication network 50, and outputs the retrieval result which is then transmitted through the communication network 50 to the retrieval device 200.

The retrieval information providing unit 310 retrieves retrieval-condition-matched information from the information stored in the information storing unit 320. The retrieval information providing unit 310 also fetches retrieval program data from the retrieval program storing unit 330. The retrieval information providing unit 310 transmits the retrieval-condition-matched information as the retrieval result, along with the retrieval program data, through the communication network 50 to the retrieval device 200. The retrieval program data may include a retrieval program, which is to be executed by the retrieval device 200 for implementation of the retrieval process, and optionally may include storing address information for designating an address of the retrieval information storing unit in the retrieval device 200 for storing the retrieval-condition-matched information as the retrieval result.

The retrieval information providing unit 310 may optionally be adjusted to retrieve the retrieval-condition-matched information from the information storing unit 320 and convert the retrieval-condition-matched information into a retrievable-format which allows retrieving the retrieval program from the retrieval program storing unit 330, thereby transmitting the converted retrieval-condition-matched information together with the retrieval program data through the communication network 50 to the retrieval device 200.

The retrieval device 200 includes a retrieval information receiving unit 210, a retrieval information storing unit 220, a control unit 230, a retrieval program execution unit 240, an input/output unit 250, a retrieval condition modifying unit 260, and a retrieval program data storing unit 270.

The input/output unit 250 receives a retrieval condition entered by the user. The input/output unit 250 also outputs signals representing the retrieval result.

The retrieval condition modifying unit 260 modifies the original retrieval condition into a modified retrieval condition. The original retrieval condition is identical with the retrieval condition which has been entered by the user through the input/output unit 250. The modified retrieval condition is the retrieval condition which has been obtained by making the original retrieval condition indistinctive or by making the extent of the original retrieval condition greater, so that the modified retrieval condition is greater and more indistinctive than the original retrieval condition. The modified retrieval condition is generated by the retrieval condition modifying unit 260 based on the original retrieval condition which has been entered by the user through the input/output unit 250.

The retrieval information receiving unit 210 transmits the retrieval request, together with the modified retrieval condition, through the communication network 50 to the retrieval server 300, so that the retrieval server 300 retrieves the information in accordance with the retrieval request under the modified retrieval condition. The retrieval server 300 transmits an indistinctive-retrieval result, including indistinctive-condition-matched information, which is matched to the modified retrieval condition, through the communication network 50 to the retrieval device 200. The retrieval information receiving unit 210 receives, from the retrieval server 300, not only the indistinctive-retrieval result including the indistinctive-condition-matched information, but also the retrieval program data which had been stored in the retrieval program storing unit 330.

The retrieval program data includes the retrieval program, which is to be executed by the retrieval program execution unit 240, for implementation of the further retrieval process from the retrieval-condition-matched information under the original retrieval condition entered by the user through the input/output unit 250, wherein the retrieval-condition-matched information is matched to the modified retrieval condition.

The retrieval information storing unit 220 receives the retrieval result from the retrieval information receiving unit 210 and stores the retrieval result which has been transmitted from the retrieval server 300. The control unit 230 controls respective operations of the retrieval information receiving unit 210, the retrieval information storing unit 220, the control unit 230, the retrieval program execution unit 240, the input/output unit 250, the retrieval condition modifying unit 260, and the retrieval program data storing unit 270. The retrieval program data storing unit 270 stores the retrieval program data which have been transmitted from the retrieval server 300.

The retrieval program execution unit 240 fetches the retrieval program data, including the retrieval program, and executes the retrieval program to retrieve original-condition-matched information from the indistinctive-condition-matched information included in the indistinctive-retrieval result and stored in the retrieval information storing unit 220 under the original retrieval condition which has been entered by the user, provided that the original-condition-matched information is matched to the original retrieval condition. The indistinctive-condition-matched information is matched to the modified retrieval condition. The original-condition-matched information is outputted through the input/output unit 250 as a second retrieval result. The original-condition-matched information is also stored in the retrieval information storing unit 220.

The original retrieval condition distinctively represents privacy-related information. In order to protect the privacy-related information, the retrieval condition modifying unit 260 modifies the original retrieval condition into the modified retrieval condition which, however, indistinctively represents the privacy-related information, wherein the modified retrieval condition is made greater and more indistinctive than the original retrieval condition.

As described above, the respective functions of the retrieval information storing unit 220, the input/output unit 250 and the retrieval condition modifying unit 260 in this second embodiment shown in FIG. 5 are substantially equal to the above-described respective functions of the retrieval information storing unit 120, the input/output unit 150 and the retrieval condition modifying unit 160 in the above-described first embodiment shown in FIG. 1.

In accordance with the above description with reference to FIG. 5, the retrieval program storing unit 330 is included in the retrieval server 300. It is, however, possible as a modification to this second embodiment that the retrieval server 300 does not include any retrieval program storing unit, and in its place, a retrieval program server is separately provided for storing plural kinds of the retrieval program data for plural retrieval servers 300, and for providing the retrieval program data through the communication network 50 to the retrieval device 200.

The operation of the above-described novel retrieval system will be described with reference to FIGS. 5 and 6. FIG. 6 is a flow chart of sequential operations of the retrieval system shown in FIG. 5. The following first to third steps S21, S22 and S23 and the sixth step S26 in this second embodiment are substantially similar to the above-described first to third steps S11, S12 and S13 and the sixth step S16 in the above-described first embodiment. The fourth and fifth steps S24 and S25 in this second embodiment are different from the fourth and fifth steps S14 and S15 in the above-described first embodiment. For those reasons, the following descriptions will focus on the fourth and fifth steps S24 and S25.

In the fourth step S24, the control unit 230 refers to the retrieval program data storing unit 270 in order to verify whether or not the retrieval program data storing unit 270 has already stored the retrieval program data in connection with the user's-selected one of the plural retrieval servers 300. The control unit 230 instructs the retrieval information receiving unit 210 to designate the modified retrieval condition, which was generated by the retrieval condition modifying unit 260, based on the original retrieval condition, which had been entered by the user through the input/output unit 250. The control unit 230 further instructs the retrieval information receiving unit 210 to transmit the modified retrieval condition, together with the retrieval request, through the communication network 50 to the retrieval server 300.

If the control unit 230 verified that the retrieval program data storing unit 270 has not yet stored the necessary retrieval program data in connection with the user's-selected one of the plural retrieval servers 300, then the control unit 230 further instructs the retrieval information receiving unit 210 to transmit a retrieval program data request through the communication network 50 to the retrieval server 300, in addition to the above-described retrieval request.

The retrieval information providing unit 310 receives both the retrieval request and the retrieval program data request. Under the modified retrieval condition, the retrieval information providing unit 310 retrieves retrieval-condition-matched information from the information stored in the information storing unit 320, wherein the retrieval-condition-matched information is matched to the modified retrieval condition. The retrieval information providing unit 310 further fetches the requested retrieval program data from the retrieval program storing unit 330. The retrieval information providing unit 310 transmits not only the retrieved information as the retrieval result, but also the fetched retrieval program data through the communication network 50 to the retrieval device 200.

The retrieval information receiving unit 210 receives both the retrieved information and the retrieval program data. The control unit 230 instructs the retrieval information receiving unit 210 to send the retrieved information to the retrieval information storing unit 220 and also to send the retrieval program data to the retrieval program data storing unit 270. The control unit 230 instructs the retrieval information storing unit 220 to store the retrieved information. The control unit 230 also instructs the retrieval program data storing unit 270 to store the retrieval program data. If old information still remains stored in the retrieval information storing unit 220, then the retrieval information storing unit 220 updates the information with the newly retrieved information. The retrieval information storing unit 220 also stores the information-obtaining time and the modified retrieval condition together with the retrieval information.

As the results, the retrieval information storing unit 220 could obtain the new retrieval information, which is matched to the modified retrieval condition. As described above, the retrieval server 300 received only the modified retrieval condition which represents the user's privacy-related information indistinctively but did not receive the original retrieval condition which represents the user's privacy-related information distinctively, for which reasons the user's privacy can be protected.

In the fifth step S25, the control unit 230 designates the original retrieval condition, which was entered by the user through the input/output unit 250, and also the retrieval program in connection with the user's-selected one of the plural retrieval servers 300. The control unit 230 instructs the retrieval program execution unit 240 to execute the retrieval program for retrieving, under the original retrieval condition, the user's requested retrieval information from the information matched to the modified retrieval condition and stored in the retrieval information storing unit 220, wherein the user's requested retrieval information is matched to the original retrieval condition. Namely, the retrieval program execution unit 240 outputs, as the retrieval result, the user's requested retrieval information.

As a modification to the above-described fifth step S25, it is possible that after the retrieval program execution unit 240 executed the retrieval program, then the retrieval program data storing unit 270 stores the executed retrieval program together with the necessary data for the retrieval process and the retrieval history and the retrieval result, so that the once-executed retrieval program may, if necessary, be executed again in a later retrieval process, thereby allowing the past retrieval history to be reflected in a later retrieval result.

As another modification to the above-described fifth step S25, it is also possible that default retrieval program data have previously been prepared in the retrieval program data storing unit 270, so that in the above step S25, this default retrieval program data may be used only if the retrieval program data in connection with the user's is selected, provided that the retrieval servers 300 are absent in the retrieval program data storing unit 270.

In accordance with the above descriptions, the retrieval device 200 receives the retrieval program data including the retrieval program from the retrieval server 300. Notwithstanding, it is possible as a modification that the retrieval device 200 receives, from the retrieval server 300, the retrieval program data, which is free of the retrieval program but includes an address or location information of the retrieval program such as the URL of the retrieval program server, so that the retrieval device 200 makes an access to the retrieval program server designated by the address or location information for receiving the retrieval program from the retrieval program server.

Accordingly, the above retrieval system allows the user to obtain the user's requested information which is matched to the original retrieval condition designated or entered by the user, whilst the user's privacy-related information can be protected, because the retrieval server 300 receives only the modified retrieval condition which represents the user's privacy-related information indistinctively, but did not receive the original retrieval condition.

Further, the retrieval system allows the retrieval device 200 to execute the retrieval program. The retrieval device 200 implements the different plural retrieval operations under the different kinds of the retrieval conditions and in accordance with the different retrieval procedures and the different algorithms.

Third Embodiment

Figure 7:
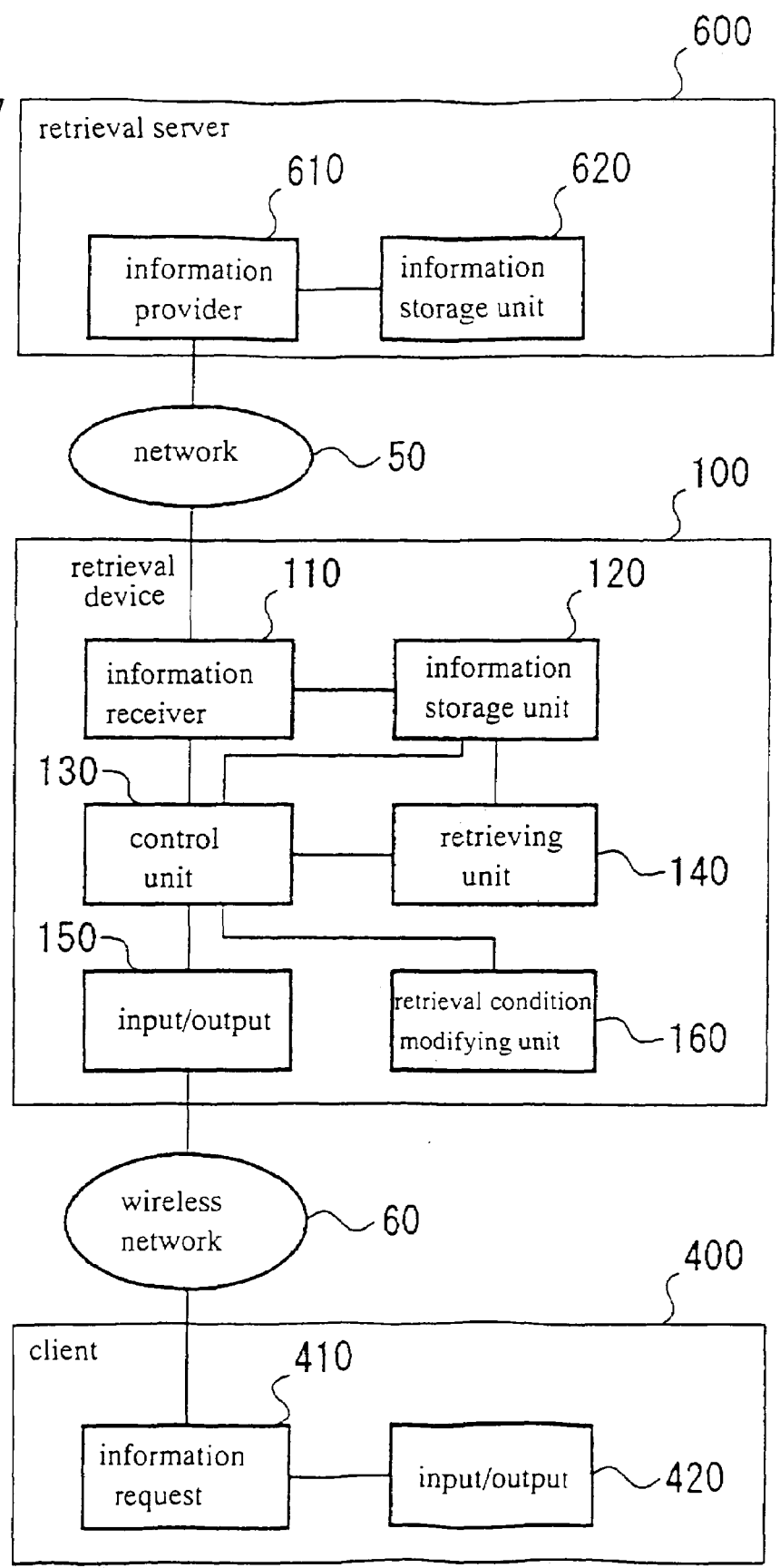
FIG. 7 is a block diagram illustrative of a configuration of a retrieval system in a third embodiment in accordance with the present invention.

A third embodiment according to the present invention will be described in detail with reference to the drawings. FIG. 7 is a block diagram illustrative of an entire configuration of a retrieval system including a retrieval server and a retrieval device, connectable through a network to the retrieval server, as well as an extended client connectable through a wireless network to the retrieval device in a third embodiment in accordance with the present invention. The retrieval system includes a retrieval server 600, a communication network 50, a retrieval device 100 connectable through the communication network 50 to the retrieval server 600 and an extended client 400 connectable through a wireless network 60 to the retrieval device 100.

The retrieval system of this third embodiment is different from the retrieval system of the above-described first embodiment in that the extended client 400 is additionally provided as a terminal device, or a subordinate client, which is connectable through the wireless network 60 to the retrieval device 100. The extended client 400 provides an interface between the user and the retrieval device 100 to allow the user to operate the extended client 400 to receive the above-described retrieval service through the retrieval device 100 from the retrieval server 600.

The retrieval server 600, the communication network 50, and the retrieval device 100 shown in FIG. 7 in this third embodiment are identical in configurations and functions to those shown in FIG. 1 in the above-described first embodiment. Namely, the retrieval server 600 includes the retrieval information providing unit 610 and the information storing unit 620. The retrieval device 100 includes the retrieval information receiving unit 110, the retrieval information storing unit 120, the control unit 130, the retrieval program execution unit 140, the input/output unit 150, and the retrieval condition modifying unit 160. The configurations and the functions of the retrieval server 600, the communication network 50, and the retrieval device 100 shown in FIG. 7 are as described in the above first embodiment.

The following descriptions will focus on the differences in configuration and function of the retrieval system shown in FIG. 7 of this third embodiment from the above-described retrieval system in the first embodiment.

The extended client 400 includes a retrieval information requesting unit 410 and an input/output unit 420. The input/output unit 420 provides an interface to the user. The retrieval information requesting unit 410 provides another interface to the retrieval device 100 through the wireless network 60. For example, the input/output unit 420 receives the original retrieval condition entered by the user. The input/output unit 420 also outputs signals for representing the retrieval result. The retrieval information requesting unit 410 is connectable through the wireless network 60 to the input/output unit 150 of the retrieval device 100. The retrieval information requesting unit 410 receives the entered original retrieval condition from the input/output unit 420, and transmits the original retrieval condition through the wireless network 60 to the input/output unit 150 of the retrieval device 100.

Figure 8:
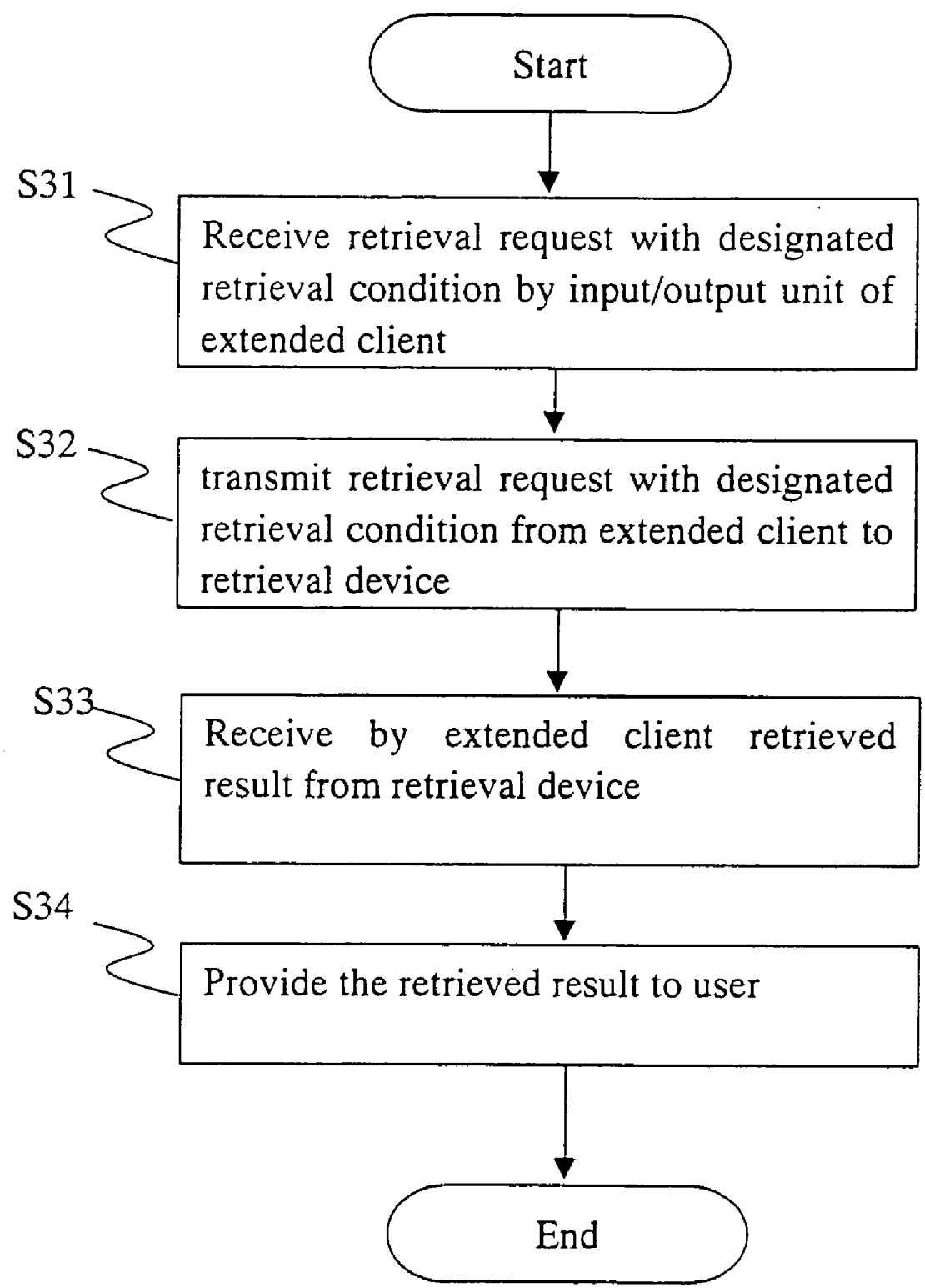
FIG. 8 is a flow chart illustrative of operations of the extended client included in the retrieval system shown in FIG. 7.

Operations of the extended client 400 will subsequently be described. FIG. 8 is a flow chart illustrative of operations of the extended client included in the retrieval system shown in FIG. 7.

In the first step S31, a retrieval request and an original retrieval condition are entered by the user into the input/output unit 420 of the extended client 400. Alternatively, it is optionally possible that the original retrieval condition is stored in a memory device, and the user may operate the extended client 400 to fetch the original retrieval condition from the memory device. Further, alternatively, it is optionally possible that the retrieval condition is generated by another device in place of the user's entry operation.

In the second step S32, the extended client 400 becomes connected through the wireless network 60 to the input/output unit 150 of the retrieval device 100, and the extended client 400 transmits the retrieval request with the original retrieval condition through the wireless network 60 to the input/output unit 150 of the retrieval device 100.

In the third step S33, the retrieval device 100 performs the same sequential retrieval processes as described above with reference to FIG. 3 in the above-described first embodiment. As the result of the sequential retrieval processes, the retrieval device 100 obtains the original-condition-matched information without making the original retrieval condition including the privacy-related information, open to the retrieval server 600. The input/output unit 150 of the retrieval device 100 transmits the original-condition-matched information through the wireless network 60 to the retrieval information requesting unit 410 of the extended client 400.

In the fourth step S34, the retrieval information requesting unit 410 sends the original-condition-matched information to the input/output unit 420. The input/output unit 420 outputs the original-condition-matched information to provide the user with the retrieval result.

The retrieval device 100 may, for example, be realized by a personal computer which is always connected through the communication network 50 to the retrieval server 600. The extended client 400 may, for example, be realized by a mobile terminal which is always carried by the user, and may optionally be connectable through the wireless network 60 to the personal computer as the retrieval device 100. This configuration of the retrieval system allows the user to obtain the retrieval result with protection of the user's privacy at any place.

In place of the mobile terminal, the retrieval device 100 may, for example, be realized by another computer owned by another person or organization, which is highly reliable in security protection, and the user may operate the extended client 400 to receive the retrieval result with protection of the privacy-related information.

The extended client 400 may optionally have an additional function of realizing the desired position detection in co-operation with any available Global Positioning System, so that the retrieved-information, based on the user's current position, may periodically or automatically be obtained with protection of the privacy-related information.

As described above, the extended client 400 has the minimum function to remote-operate the retrieval device 100, but is free of any retrieving function, for which reason the extended client 400 may be reduced in size and weight.

Fourth Embodiment

Figure 9:
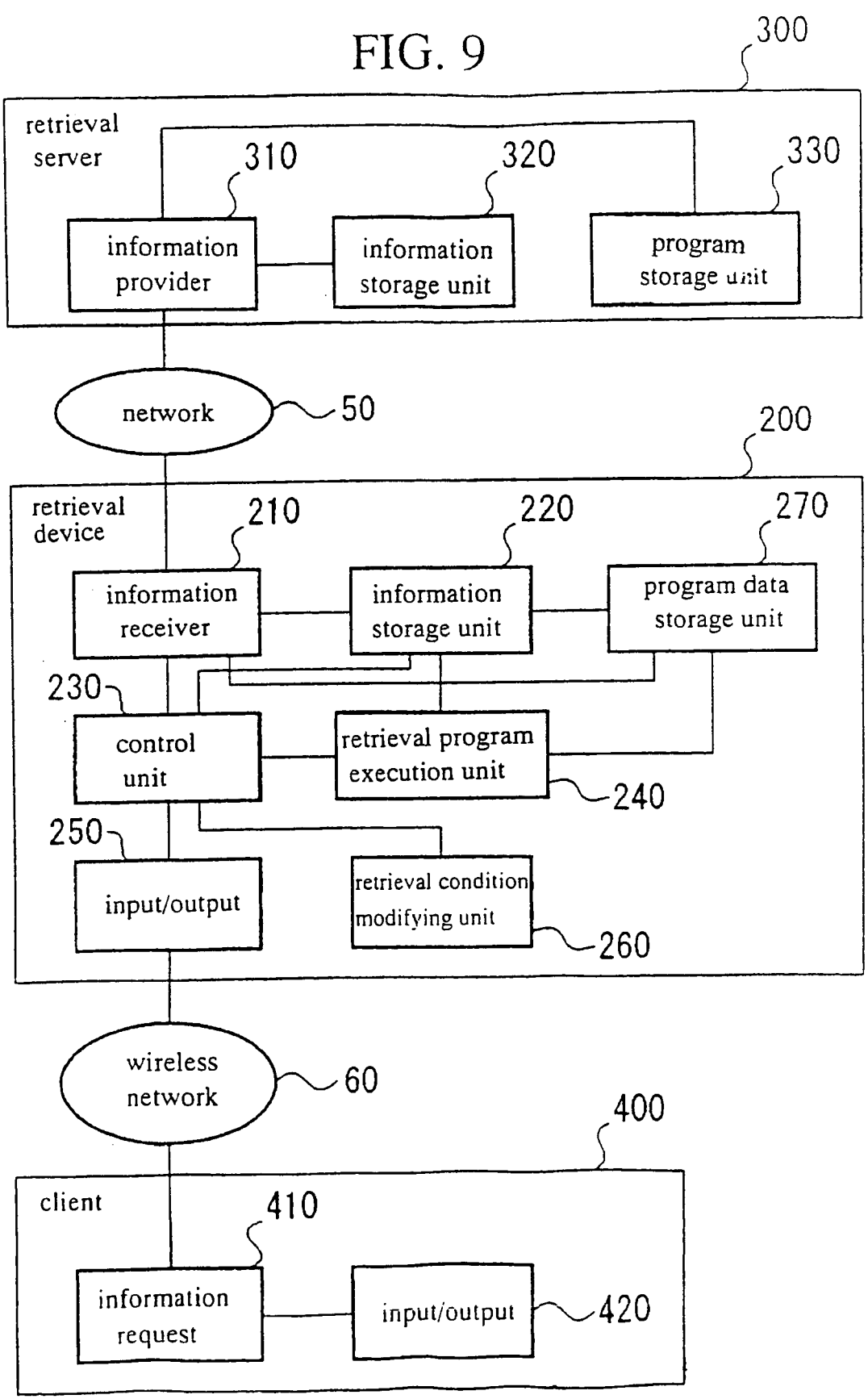
FIG. 9 is a block diagram illustrative of a configuration of a retrieval system in a fourth embodiment in accordance with the present invention.

A fourth embodiment according to the present invention will be described in detail with reference to the drawings. FIG. 9 is a block diagram illustrative of an entire configuration of a retrieval system including a retrieval server and a retrieval device, connectable through a network to the retrieval server, as well as an extended client connectable through a wireless network to the retrieval device in a fourth embodiment in accordance with the present invention. The retrieval system includes a retrieval server 300, a communication network 50, a retrieval device 200 connectable through the communication network 50 to the retrieval server 300, and an extended client 400 connectable through a wireless network 60 to the retrieval device 200.

The retrieval system of this fourth embodiment is different from the retrieval system of the above-described second embodiment in that the extended client 400 is additionally provided as a terminal device or a subordinate client which is connectable through the wireless network 60 to the retrieval device 200. The extended client 400 provides an interface between the user and the retrieval device 200 to allow the user to operate the extended client 400 to receive the above-described retrieval service through the retrieval device 200 from the retrieval server 300.

The retrieval server 300, the communication network 50, and the retrieval device 200 shown in FIG. 9 in this fourth embodiment are identical in configurations and functions to those shown in FIG. 5 in the above-described second embodiment. Namely, the retrieval server 300 includes the retrieval information providing unit 310, the information storing unit 320, and the retrieval program storing unit 330.

The retrieval device 200 includes the retrieval information receiving unit 210, the retrieval information storing unit 220, the control unit 230, the retrieval program execution unit 240, the input/output unit 250, the retrieval condition modifying unit 260, and the retrieval program data storing unit 270. The configurations and the functions of the retrieval server 300, the communication network 50, and the retrieval device 200 shown in FIG. 9 are as described in the above second embodiment.

The following descriptions will focus on the differences in configuration and function of the retrieval system shown in FIG. 9 of this fourth embodiment from the above-described retrieval system in the second embodiment.

The extended client 400 includes a retrieval information requesting unit 410 and an input/output unit 420. The input/output unit 420 provides an interface to the user. The retrieval information requesting unit 410 provides another interface to the retrieval device 200 through the wireless network 60. For example, the input/output unit 420 receives the original retrieval condition entered by the user. The input/output unit 420 also outputs signals for representing the retrieval result. The retrieval information requesting unit 410 is connectable through the wireless network 60 to the input/output unit 250 of the retrieval device 200. The retrieval information requesting unit 410 receives the entered original retrieval condition from the input/output unit 420, and transmits the original retrieval condition through the wireless network 60 to the input/output unit 250 of the retrieval device 200.

Figure 10:
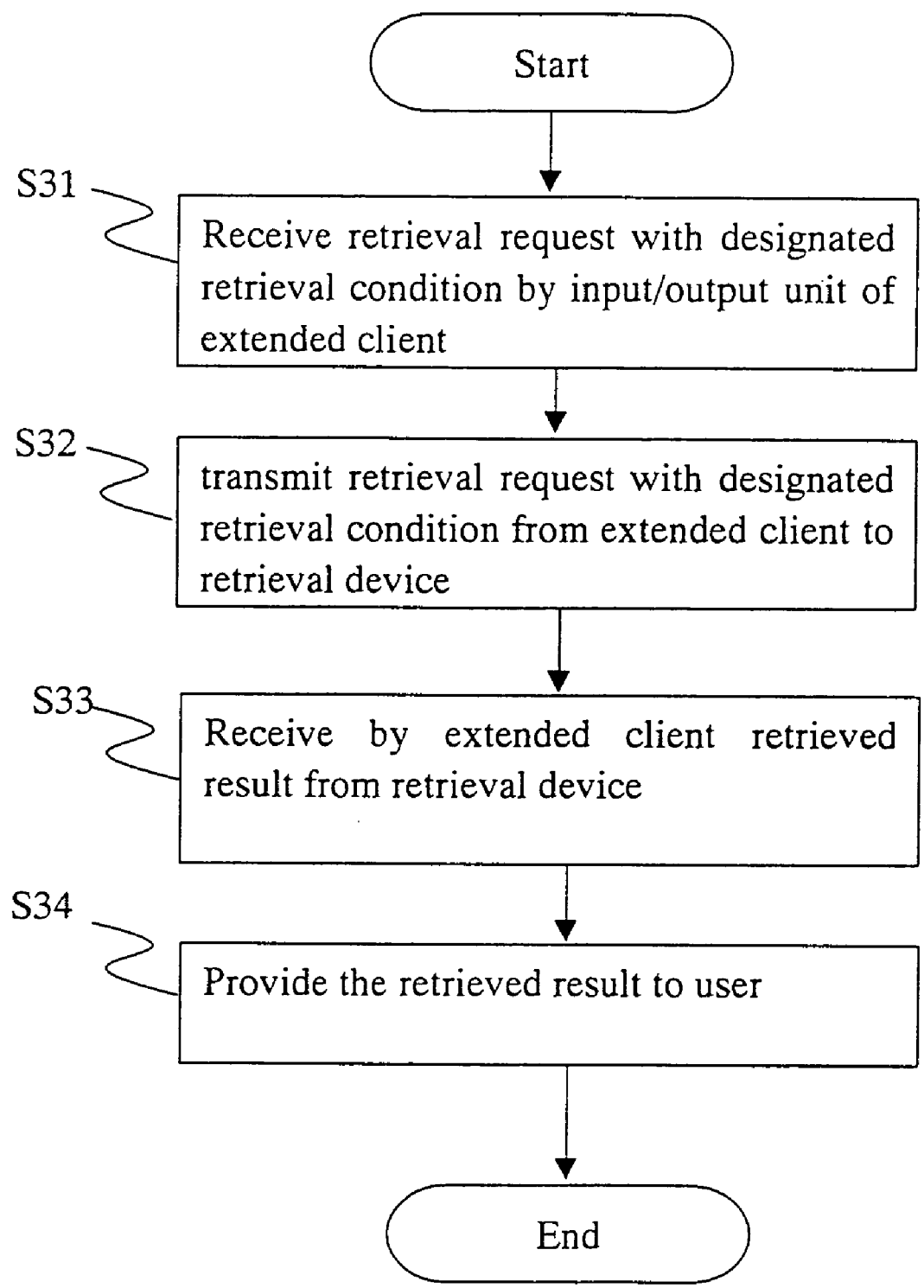
FIG. 10 is a flow chart illustrative of operations of the extended client included in the retrieval system shown in FIG. 9.

Operations of the extended client 400 will subsequently be described. FIG. 10 is a flow chart illustrative of operations of the extended client included in the retrieval system shown in FIG. 9.

In the first step S31, a retrieval request and an original retrieval condition are entered by the user into the input/output unit 420 of the extended client 400. Alternatively, it is optionally possible that the original retrieval condition is stored in a memory device, and the user may operate the extended client 400 to fetch the original retrieval condition from the memory device. Further, alternatively, it is optionally possible that the retrieval condition is generated by another device in place of the user's entry operation.

In the second step S32, the extended client 400 becomes connected through the wireless network 60 to the input/output unit 250 of the retrieval device 200, and the extended client 400 transmits the retrieval request with the original retrieval condition through the wireless network 60 to the input/output unit 250 of the retrieval device 200.

In the third step S33, the retrieval device 200 performs the same sequential retrieval processes as described above with reference to FIG. 6 in the above-described second embodiment. As the result of the sequential retrieval processes, the retrieval device 200 obtains the original-condition-matched information without making the original retrieval condition, including the privacy-related information, open to the retrieval server 300. The input/output unit 250 of the retrieval device 200 transmits the original-condition-matched information through the wireless network 60 to the retrieval information requesting unit 410 of the extended client 400.

In the fourth step S34, the retrieval information requesting unit 410 sends the original-condition-matched information to the input/output unit 420. The input/output unit 420 outputs the original-condition-matched information to provide the user with the retrieval result.

The retrieval device 200 may, for example, be realized by a personal computer which is always connected through the communication network 50 to the retrieval server 300. The extended client 400 may, for example, be realized by a mobile terminal which is always carried by the user, and may optionally be connectable through the wireless network 60 to the personal computer as the retrieval device 200. This configuration of the retrieval system allows the user to obtain the retrieval result with protection of the user's privacy at any place.

In place of the mobile terminal, the retrieval device 200 may, for example, be realized by another computer owned by another person or organization, which is highly reliable in security protection, and the user may operate the extended client 400 to receive the retrieval result with protection of the privacy-related information.

The extended client 400 may optionally have an additional function of realizing a position detection in co-operation with any available Global Positioning System, so that the retrieved-information, based on the user's current position, may periodically or automatically be obtained with protection of the privacy-related information.

As described above, the extended client 400 has the minimum function to remote-operate the retrieval device 200, but is free of any retrieving function, for which reason the extended client 400 may be reduced in size and weight.

Fifth Embodiment

Figure 11:
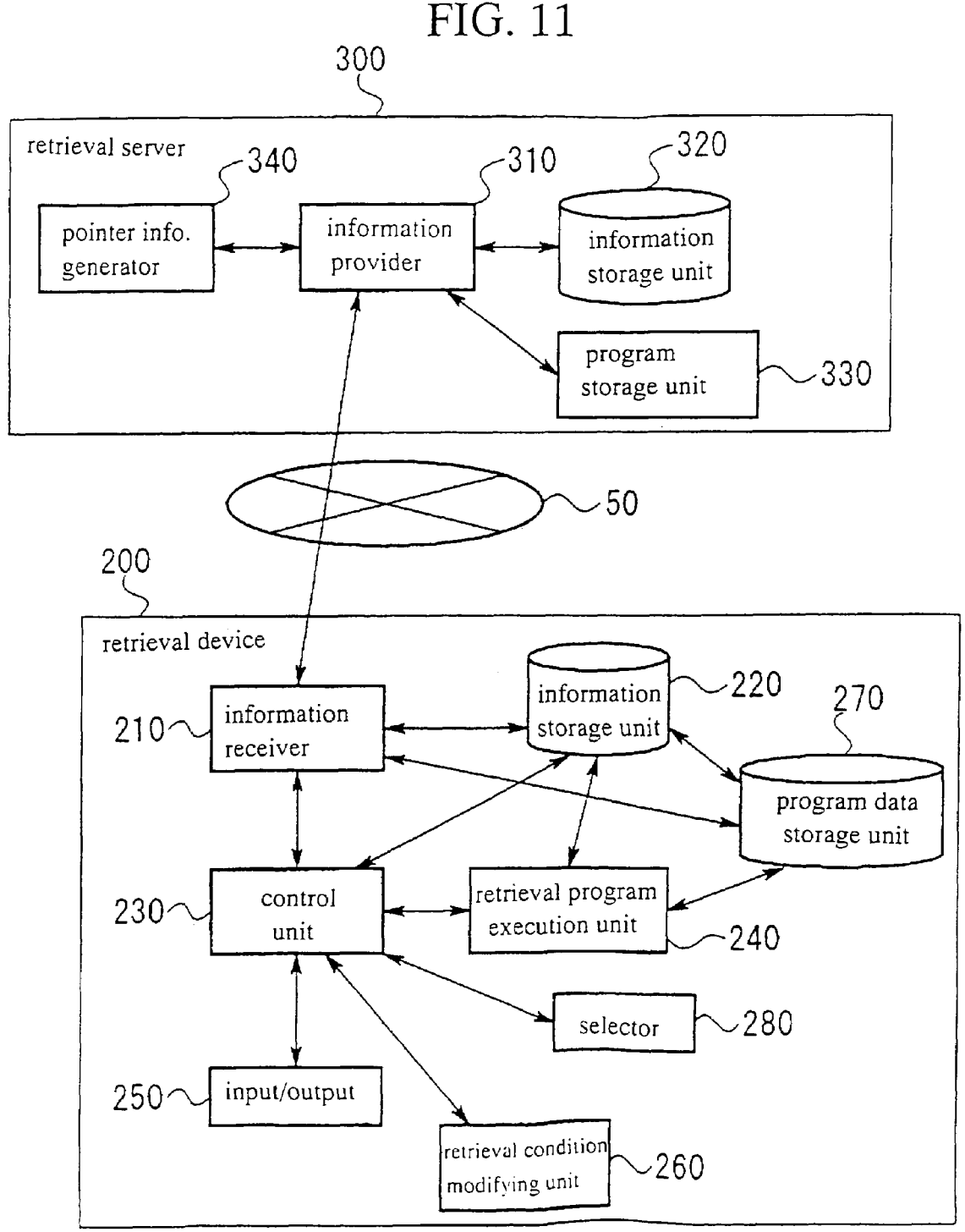
FIG. 11 is a block diagram illustrative of a configuration of a retrieval system in a fifth embodiment in accordance with the present invention.

A fifth embodiment according to the present invention will be described in detail with reference to the drawings. FIG. 11 is a block diagram illustrative of an entire configuration of a retrieval system including a retrieval server and a retrieval device, connectable through a network to the retrieval server, in this fifth embodiment. The retrieval system includes a retrieval server 300', a communication network 50 and a retrieval device 200' connectable through the communication network 50 to the retrieval server 300'.

The retrieval system of this fifth embodiment is different from the retrieval system of the above-described second embodiment in that the retrieval server 300' further includes a pointer information generating unit 340, and the retrieval device 200' further includes a selector 280.

The retrieval server 300' includes the retrieval information providing unit 310, the information storing unit 320, the retrieval program storing unit 330, and the pointer information generating unit 340. The retrieval device 200' includes the retrieval information receiving unit 210, the retrieval information storing unit 220, the control unit 230, the retrieval program execution unit 240, the input/output unit 250, the retrieval condition modifying unit 260, the retrieval program data storing unit 270, and the selector 280. The configurations and the functions of the retrieval server 300', the communication network 50, and the retrieval device 200' shown in FIG. 11 are as described in the above second embodiment except for the pointer information generating unit 340 and the selector 280.

The following descriptions will focus on the differences in configuration and function of the retrieval system shown in FIG. 11 of this fifth embodiment from the above-described retrieval system in the second embodiment.

The pointer information generating unit 340 is additionally provided in the retrieval server 300' for generating a list of pointer information obtained by simplifying the retrieval-condition-matched information which are matched to the original retrieval conditions received by the retrieval information providing unit 310 from the retrieval device 200' through the communication network 50. The pointer information means information which includes the simplified contents obtained by simplifying the original information, and the necessary information for obtaining the original information. If, for example, the retrieval information is shop information which comprises the shop name, the location, the contact information, and the open time, then the pointer information may optionally comprise the shop name solely, or in combination with additional location information such as a URL for allowing the user to obtain shop-related information.

The retrieval program storing unit 330 stores the retrieval program data for retrieving the pointer information, in addition to the retrieval program to be executed by the retrieval program execution unit 240 of the retrieval device 200'. The retrieval information providing unit 310 transmits the retrieval program data with the pointer information to the retrieval device 200' through the communication network 50 to the retrieval device 200'.

The selector 280 is additionally provided in the retrieval device 200' for requesting the user to select a desired-one item of the pointer information on the pointer information list for obtaining the detailed or full information based on the selected pointer information. If the user selects the shop name, then the retrieval information receiving unit 210 transmits a request for detailed or full information in connection with the selected shop name as the pointer information through the communication network 50 to the retrieval server 300'. In addition, the retrieval information receiving unit 210 automatically selects, in random, one or more non-requested shop names as non-requested dummy pointer information from the pointer information list, so as to transmit the non-requested shop names together with the user's selected shop name as the user's selected pointer information through the communication network 50 to the retrieval server 300'. The retrieval server 300' receives not only the user's selected shop name as the user's selected pointer information but also the non-requested shop names as the non-requested dummy pointer information. The retrieval server 300' and another server are unable to distinguish the user's selected pointer information and the non-requested dummy pointer information. The retrieval server 300' and the other server merely recognize both items of information to be plural pointer information transmitted from the retrieval device 200'. This function and configuration effectively protect the user's privacy-related information from another server.

As a modification to this fifth embodiment, it is possible that the detailed or full information in respective correspondence with the pointer information may be managed by another server than the retrieval server 300', and the pointer information generating unit 340 generates server-designating information which designates the server which stores the detailed or full information in connection with the pointer information which is generated by the pointer information generating unit 340, so as to allow the retrieval server 200' to obtain the detailed or full information in connection with the pointer information from the designated server other than the retrieval server 300'.

As a further modification to this fifth embodiment, it is, of course, possible that the above additional configuration and function in connection with the pointer information generating unit 340 and the selector 280 are applied to the above-described other embodiments than the second and fifth embodiments.

Modifications

Possible modifications to the foregoing embodiments are also available. The following descriptions will be made by applying to the second embodiment with reference again to FIG. 5. Even more embodiments may optionally be modified in the same manner.

In the above-described second embodiment, upon receipt of the retrieval request, the control unit 230 decides the need of updating the retrieval information stored in the retrieval information storing unit 220, and, if necessary, instructs the retrieval information receiving unit 110 to update the retrieval information stored in the retrieval information storing unit 220.

It is possible as a modification that, independent from the timing of receipt of the retrieval request, the control unit 230 automatically and periodically decides the need of updating the retrieval information stored in the retrieval information storing unit 220. For example, the decision may be made depending on the passing time from the last updating time. This modified configuration allows that, if the retrieval information storing unit 120 has already obtained the latest retrieval information at the time of receiving the retrieval request from the user, then the retrieval device 200 provides the user with the retrieval result of the user's requested information matched to the original retrieval condition without generating the modified retrieval condition, and also without access to the retrieval server 300. This configuration reduces the necessary time for providing the user with the retrieval result.

It is possible as another modification that the control unit 230 predicts a future-designated retrieval condition, which will be designated or entered by the user in the future, so that the retrieval result based on the modified retrieval condition is previously obtained from the retrieval server 300, prior to receipt of the real retrieval request with the original retrieval condition.

Namely, the control unit 230 instructs the retrieval condition modifying unit 260 to modify the predicted retrieval condition, which represents possible-privacy-related information distinctively, into the modified retrieval condition, which represents the possible-privacy-related information indistinctively. The control unit 130 instructs the retrieval information receiving unit 210 to transmit both a preliminary retrieval request and the modified retrieval condition, which was generated from the predicted retrieval condition, through the communication network 50 to the retrieval server 300. The retrieval information providing unit 310 retrieves retrieval-condition-matched information from the information stored in the information storing unit 320, wherein the retrieval-condition-matched map information is matched to the modified retrieval condition. The retrieval information providing unit 310 transmits the retrieved information as the retrieval result through the communication network 50 to the retrieval device 200.

The retrieval information receiving unit 210 receives the retrieved information. The control unit 230 instructs the retrieval information receiving unit 210 to send the retrieved information to the retrieval information storing unit 220. The control unit 230 instructs the retrieval information storing unit 220 to store the retrieved information.

Upon receipt of the real retrieval request with the original retrieval condition from the user, the retrieval device 200 retrieves the user's desired information, which is matched to the original retrieval condition, from the retrieval information stored in the retrieval information storing unit 220, without generating the modified retrieval condition and also without access to the retrieval server 300. This configuration reduces the necessary time for providing the user with the retrieval result.

It is possible as still another modification that the retrieval device 200 may receive only differential retrieval information from the retrieval server 300. In addition to the modified retrieval condition, the retrieval information receiving unit 210 transmits the contents of the information stored in the retrieval information storing unit 220 to the retrieval server 300. The retrieved information providing unit 310 of the retrieval server 300 compares the retrieved information based on the modified retrieval condition to the contents of the information stored in the retrieval information storing unit 220, so that the retrieved information providing unit 310 transmits only the differential information, which is different from the contents, to the retrieval information receiving unit 110 of the retrieval device 200.

The retrieval information receiving unit 110 updates the information stored in the retrieval information storing unit 220 based on the received differential information. This configuration reduces the amount of the information transmitted from the retrieved information providing unit 310 through the communication network to the retrieval information receiving unit 210 as well as reducing the transmission time thereof.

It is possible as further modification that, independent from the timing of the retrieval request, the retrieval information receiving unit 210 receives updating information from the retrieval server 300 at the same time as updating the information stored in the information storing unit 320, so that the retrieval information receiving unit 210 updates the information stored in the retrieval information storing unit 220 based on the updating information. As a result, the retrieval information storing unit 220 always keeps the newest retrieval information.

In the foregoing embodiments and possible modifications, each unit constituting the retrieval device and the retrieval server may optionally comprise a specified piece of hardware or a combination of a memory storing a specified program and a processor such as a CPU for executing the specified program to implement the respective function of the unit. The memory may optionally comprise any available storing means, for example, various non-volatile memories such as a hard-disk device, an optical magnetic disk device and a flash memory, and various volatile memories such as a RAM, as well as various storage mediums such as a CD-ROM.

It is also possible that a computer readable program is stored in a computer-readable storage medium, and this program is loaded from the computer-readable storage medium to the computer system, and executed thereby for implementing the respective function. The computer system may include an operating system and hardware as peripheral devices. If the computer system utilizes the World-Wide-Web system, the computer system may include home-page providing or displaying environments.

The computer-readable storage medium may include various portable mediums such as a flexible disk, an optical magnetic disk, a ROM, a CD-ROM, and an integrated memory such as hard disk in the computer system. The computer-readable storage medium may also include volatile memories such as a RAM integrated in the computer system, server or client.

The computer-readable program may be stored in the memory in the computer system, so that the program is transmitted from the computer system through the transmission medium including the transmission wave to the other computer system. The transmission medium may be a medium capable of transmitting the program such as a network, communication network or communication lines.

The program may optionally implement a part of the functions described above. The program may optionally be a differential program.

Although the invention has been described above in connection with several preferred embodiments thereof, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the invention.

What is claimed is:

1. A retrieval device accessible to at least one retrieval server providing retrieval service, said retrieval device comprising:

a retrieval condition modifying unit for modifying a first retrieval condition having a first scale into a second retrieval condition having a second scale which includes said first scale and which is greater than said first scale;

a retrieval information receiving unit for transmitting said second retrieval condition to said retrieval server and for receiving first retrieved information matched to said second retrieval condition from said retrieval server; and a retrieving unit for retrieving second retrieved information from said first retrieved information, said second retrieved information being matched to said first retrieval condition, so that said second retrieved information has a lesser scale than does said first retrieved information, wherein said first retrieval condition includes a first factor in connection with a user's privacy-related information, and said second retrieval condition includes a second factor corresponding to said first factor, said second factor having a greater scale than said first factor, wherein said retrieval information receiving unit is configured to receive, from said retrieval server, pointer information in connection with said first retrieved information; and wherein said retrieving unit is configured to retrieve condition-matched pointer information, which is matched to said first retrieval condition, from said received pointer information.

2. The retrieval device as claimed in claim 1, wherein said retrieval condition modifying unit is adjustable for modifying said first retrieval condition into said second retrieval condition in accordance with a predetermined degree of indistinctness for each kind of factor of said second retrieval condition, and in accordance with a predetermined procedure for modifying said first retrieval condition into said second retrieval condition, and said retrieval condition modifying unit is also adjustable for maintaining said predetermined degree of indistinctness and said predetermined procedure.

3. The retrieval device as claimed in claim 1, wherein said retrieval condition modifying unit is adjustable for modifying said first retrieval condition into said second retrieval condition in accordance with a user-designated degree of indistinctness for each kind of factor of said second retrieval condition, and in accordance with a user-designated procedure for modifying said first retrieval condition into said second retrieval condition.

4. The retrieval device as claimed in claim 1, further comprising a first memory for storing said first retrieval condition when entered by the user, wherein said retrieval condition modifying unit is adjustable for fetching said first retrieval condition from said first memory and for modifying said first retrieval condition into said second retrieval condition upon receipt of a retrieval request.

5. The retrieval device as claimed in claim 1, wherein said retrieval device is accessible by an external device, which is capable of generating at least a part of said first retrieval condition, for receiving said at least a part of said first retrieval condition from said external device.

6. The retrieval device as claimed in claim 1, wherein said retrieval condition modifying unit is adjustable for selectively deleting each factor of said second retrieval condition upon receipt of a user's instruction.

7. The retrieval device as claimed in claim 1, further comprising:
a first retrieved information storing unit for storing said first retrieved information, while allowing said retrieving unit to retrieve said second retrieved information from said first retrieved information storing unit.

8. The retrieval device as claimed in claim 7, further comprising:
a control unit for making a decision to update said first retrieved information stored in said first retrieved information storing unit by verifying whether said first retrieved information stored in said first retrieved information storing unit includes any content in connection with said first retrieval condition.

9. The retrieval device as claimed in claim 8, wherein said control unit is configured to make a decision to update said first retrieved information upon receipt of a retrieval request.

10. The retrieval device as claimed in claim 8, wherein said control unit automatically makes a decision to update said first retrieved information periodically.

11. A retrieval device accessible to at least one retrieval server providing retrieval service, said retrieval device comprising:
a retrieval condition modifying unit for modifying a first retrieval condition having a first scale into a second retrieval condition having a second scale which includes said first scale and which is greater than said first scale;
a retrieval information receiving unit for transmitting said second retrieval condition to said retrieval server and for receiving first retrieved information matched to said second retrieval condition from said retrieval server;
a retrieving unit for retrieving second retrieved information from said first retrieved information, said second retrieved information being matched to said first retrieval condition, so that said second retrieved information has a lesser scale than does said first retrieved information;
a first retrieved information storing unit for storing said first retrieved information, while allowing said retrieving unit to retrieve said second retrieved information from said first retrieved information storing unit; and
a control unit for making a decision to update said first retrieved information stored in said first retrieved information storing unit by verifying whether said first retrieved information stored in said first retrieved information storing unit includes any content in connection with said first retrieval condition,
wherein said first retrieval condition includes a first factor in connection with a user's privacy-related information, and said second retrieval condition includes a second factor corresponding to said first factor, said second factor having a greater scale than said first factor,
wherein said control unit is adjustable for predicting a first retrieval condition to be entered in the future, and for generating the predicted retrieval condition in connection with said first retrieval condition,
wherein said retrieval condition modifying unit is configured for modifying said predicted retrieval condition into said second retrieval condition, and
wherein said retrieval information receiving unit is configured for transmitting said second retrieval condition to said retrieval server and for receiving said first retrieved information matched to said second retrieval condition from said retrieval server.

12. A retrieval device accessible to at least one retrieval server providing retrieval service, said retrieval device comprising:
a retrieval condition modifying unit for modifying a first retrieval condition having a first scale into a second retrieval condition having a second scale which includes said first scale and which is greater than said first scale;
a retrieval information receiving unit for transmitting said second retrieval condition to said retrieval server and for receiving first retrieved information matched to said second retrieval condition from said retrieval server;
a retrieving unit for retrieving second retrieved information from said first retrieved information, said second retrieved information being matched to said first retrieval condition, so that said second retrieved information has a lesser scale than does said first retrieved information;
a first retrieved information storing unit for storing said first retrieved information, while allowing said retrieving unit to retrieve said second retrieved information from said first retrieved information storing unit; and
a control unit for making a decision to update said first retrieved information stored in said first retrieved information storing unit by verifying whether said first retrieved information stored in said first retrieved information storing unit includes any content in connection with said first retrieval condition,
wherein said first retrieval condition includes a first factor in connection with a user's privacy-related information, and said second retrieval condition includes a second factor corresponding to said first factor, said second factor having a greater scale than said first factor, and
wherein said retrieval information receiving unit is configured for transmitting contents of said first retrieved information stored in said first retrieved information storing unit, in addition to said first retrieval condition, to said retrieval server, for receiving differential information in connection with said first retrieved information from said retrieval server, and for updating said first retrieved information based on said differential information.

13. The retrieval device as claimed in claim 1, wherein said retrieving unit is configured to receive retrieval program data, including a retrieval program, from said retrieval server, and to retrieve said second retrieved information in accordance with said retrieval program.

14. The retrieval device as claimed in claim 1, wherein:
said retrieval device is configured to receive retrieval program data, including a retrieval program, from a retrieval program server separately from said first retrieved information; and
said retrieving unit is configured to retrieve said second retrieved information in accordance with said retrieval program.

15. The retrieval device as claimed in claim 1, further comprising:
an input/output unit connectable through a wireless network to an extended client operable by a user.

16. The retrieval device as claimed in claim 15, further comprising an extended client comprising a mobile terminal.

17. The retrieval device as claimed in claim 1, wherein:
said retrieval information receiving unit is configured to receive, from said retrieval server, a retrieval program in addition to said condition-matched pointer information; and
said retrieving unit is configured to retrieve said condition-matched pointer information in accordance with said retrieval program.

18. The retrieval device as claimed in claim 1, further comprising:
a selector for selecting pointer information from said received pointer information in accordance with a user's instruction, and
wherein said retrieval information receiving unit is configured to transmit, to said retrieval server, said selected pointer information and a request for full information in connection with said selected pointer information.

19. The retrieval device as claimed in claim 18, wherein said retrieval information receiving unit is configured to transmit an item of non-requested dummy pointer information, in addition to said selected pointer information, and a request for full information in connection with both said selected pointer information and said non-requested dummy pointer information.

20. The retrieval device as claimed in claim 1, further comprising:
a selector for selecting pointer information from said received pointer information in accordance with a user's instruction, wherein:
said retrieval information receiving unit is configured to transmit, to a server other than said retrieval server, said selected pointer information and a request for full information in connection with said selected pointer information, and
said other server is configured to maintain said full information in connection with said selected pointer information.

21. The retrieval device as claimed in claim 20, wherein said retrieval information receiving unit is configured to transmit an item of non-requested dummy pointer information, in addition to said selected pointer information, and a request for full information in connection with both said selected pointer information and said non-requested dummy pointer information.

22. A retrieval system comprising:
a retrieval server for providing retrieval service; and
a retrieval device accessible through a transmission medium to said retrieval server, said retrieval device comprising:
a retrieval condition modifying unit for modifying a first retrieval condition having a first scale into a second retrieval condition having a second scale which includes said first scale and which is greater than said first scale;
a retrieval information receiving unit for transmitting said second retrieval condition to said retrieval server, to allow said retrieval server to retrieve first retrieved information which is matched to said second retrieval condition, and for receiving said first retrieved information from said retrieval server; and a retrieving unit for retrieving second retrieved information from said first retrieved information, said second retrieved information being matched to said first retrieval condition, so that said second retrieved information has a lesser scale than does said first retrieved information,
wherein said first retrieval condition includes a first factor, in connection with a user's privacy-related information, and said second retrieval condition includes a second factor, corresponding to said first factor,
wherein said second factor has a greater scale than said first factors
wherein said retrieval server further comprises a pointer information generating unit for generating pointer information in connection with said first retrieved information,
wherein said retrieval information receiving unit is configured to receive, from said retrieval server, said generated pointer information, and
wherein said retrieving unit is configured to retrieve condition-matched pointer information, which is matched to said first retrieval condition, from said received pointer information.

23. The retrieval system as claimed in claim 22, wherein:
said retrieval condition modifying unit is configured to be adjustable to modify said first retrieval condition into said second retrieval condition in accordance with a predetermined degree of indistinctness for each kind of factor of said second retrieval condition, and a predetermined procedure for modifying said first retrieval condition into said second retrieval condition, and also configured to maintain said predetermined degree of indistinctness and said predetermined procedure.

24. The retrieval system as claimed in claim 22, wherein said retrieval condition modifying unit is configured to be adjustable to modify said first retrieval condition into said second retrieval condition in accordance with a user-designated degree of indistinctness for each kind of factor of said second retrieval condition and a user-designated procedure for modifying said first retrieval condition into said second retrieval condition.

25. The retrieval system as claimed in claim 22, wherein said retrieval device further comprises a first memory for storing said first retrieval condition, and said retrieval condition modifying unit is configured to fetch said first retrieval condition from said first memory and to modify said first retrieval condition into said second retrieval condition upon receipt of a retrieval request.

26. The retrieval system as claimed in claim 22, wherein said retrieval device is accessible to an external device, which is capable of generating at least a part of said first retrieval condition, for receiving said at least a part of said first retrieval condition from the external device.

27. The retrieval system as claimed in claim 22, wherein said retrieval condition modifying unit is configured to be adjustable to selectively delete each factor of said second retrieval condition upon receipt of a user's instruction.

28. The retrieval system as claimed in claim 22, wherein said retrieval device further comprises:
a first retrieved information storing unit for storing said first retrieved information and for allowing said retrieving unit to retrieve said second retrieved information from said first retrieved information storing unit.

29. The retrieval system as claimed in claim 28, wherein said retrieval device further comprises:
a control unit for making a decision to update said first retrieved information stored in said first retrieved information storing unit by verifying whether said first retrieved information stored in said first retrieved information storing unit includes any content in connection with said first retrieval condition.

30. The retrieval system as claimed in claim 29, wherein said control unit is configured to make a decision to update said first retrieved information upon receipt of a retrieval request.

31. The retrieval system as claimed in claim 29, wherein said control unit is configured to automatically make a decision to update said first retrieved information periodically.

32. A retrieval system comprising:
a retrieval server for providing retrieval service; and
a retrieval device accessible through a transmission medium to said retrieval server, said retrieval device comprising:
a retrieval condition modifying unit for modifying a first retrieval condition having a first scale into a second retrieval condition having a second scale which includes said first scale and which is greater than said first scale;
a retrieval information receiving unit for transmitting said second retrieval condition to said retrieval server, to allow said retrieval server to retrieve first retrieved information which is matched to said second retrieval condition, and for receiving said first retrieved information from said retrieval server;
a retrieving unit for retrieving second retrieved information from said first retrieved information, said second retrieved information being matched to said first retrieval condition, so that said second retrieved information has a lesser scale than does said first retrieved information;
a first retrieved information storing unit for storing said first retrieved information and for allowing said retrieving unit to retrieve said second retrieved information from said first retrieved information storing unit; and
a control unit for making a decision to update said first retrieved information stored in said first retrieved information storing unit by verifying whether said first retrieved information stored in said first retrieved information storing unit includes any content in connection with said first retrieval condition,
wherein said first retrieval condition includes a first factor, in connection with a user's privacy-related information, and said second retrieval condition includes a second factor, corresponding to said first factor,
wherein said second factor has a greater scale than said first factor,
wherein said control unit is configured to be adjustable to predict said first retrieval condition to be entered in the future, and generates a predicted retrieval condition in connection with said first retrieval condition,
wherein said retrieval condition modifying unit is configured to modify said predicted retrieval condition into said second retrieval condition, and
wherein said retrieval information receiving unit is configured to transmit said second retrieval condition to said retrieval server and to receive said first retrieved information matched to said second retrieval condition from said retrieval server.

33. A retrieval system comprising:
a retrieval server for providing retrieval service; and
a retrieval device accessible through a transmission medium to said retrieval server, said retrieval device comprising:
a retrieval condition modifying unit for modifying a first retrieval condition having a first scale into a second retrieval condition having a second scale which includes said first scale and which is greater than said first scale;
a retrieval information receiving unit for transmitting said second retrieval condition to said retrieval server, to allow said retrieval server to retrieve first retrieved information which is matched to said second retrieval condition, and for receiving said first retrieved information from said retrieval server;
a retrieving unit for retrieving second retrieved information from said first retrieved information, said second retrieved information being matched to said first retrieval condition, so that said second retrieved information has a lesser scale than does said first retrieved information;
a first retrieved information storing unit for storing said first retrieved information and for allowing said retrieving unit to retrieve said second retrieved information from said first retrieved information storing unit; and
a control unit for making a decision to update said first retrieved information stored in said first retrieved information storing unit by verifying whether said first retrieved information stored in said first retrieved information storing unit includes any content in connection with said first retrieval condition,
wherein said first retrieval condition includes a first factor, in connection with a user's privacy-related information, and said second retrieval condition includes a second factor, corresponding to said first factor,
wherein said second factor has a greater scale than said first factor,
wherein said control unit is configured to be adjustable to predict said first retrieval condition to be entered in the future, and generates a predicted retrieval condition in connection with said first retrieval condition, and
wherein said retrieval information receiving unit is configured to transmit contents of said first retrieved information, stored in said first retrieved information storing unit, in addition to said first retrieval condition to said retrieval server, and to receive differential information in connection with said first retrieved information from said retrieval server for updating said first retrieved information based on said differential information.

34. The retrieval system as claimed in claim 22, wherein:
said retrieval server is configured to provide said retrieval device with retrieval program data including a retrieval program; and
said retrieving unit is configured to retrieve said second retrieved information in accordance with said retrieval program.

35. The retrieval system as claimed in claim 22, wherein said retrieval device is configured to receive retrieval program data including a retrieval program from a retrieval program server separately from said first retrieved information; and
said retrieving unit is configured to retrieve said second retrieved information in accordance with said retrieval program.

36. The retrieval system as claimed in claim 22, wherein said retrieval device further comprises:
an input/output unit connectable through a wireless network to an extended client operable by a user.

37. The retrieval system as claimed in claim 36, wherein said retrieval device further comprises an extended client comprising a mobile terminal.

38. The retrieval system as claimed in claim 22, wherein:
said retrieval information receiving unit is configured to receive, from said retrieval server, a retrieval program in addition to said condition-matched pointer information; and
said retrieving unit is configured to retrieve said condition-matched pointer information in accordance with said retrieval program.

39. The retrieval system as claimed in claim 22, wherein said retrieval device further comprises:
a selector for selecting pointer information from said received pointer information in accordance with a user's instruction, and
said retrieval information receiving unit transmits, to said retrieval server, said selected pointer information and a request for full information in connection with said selected pointer information.

40. The retrieval system as claimed in claim 39, wherein said retrieval information receiving unit transmits an item of non-requested dummy pointer information in addition to said selected pointer information and a request for full information in connection with both said selected pointer information and said non-requested dummy pointer information.

41. The retrieval system as claimed in claim 22, wherein said retrieval device further comprises:
a selector for selecting pointer information from said received pointer information in accordance with a user's instruction, and
said retrieval information receiving unit transmits, to a server other than said retrieval server, said selected pointer information and a request for full information in connection with said selected pointer information, where the other server maintains said full information in connection with said selected pointer information.

42. The retrieval system as claimed in claim 41, wherein said retrieval information receiving unit transmits an item of non-requested dummy pointer information in addition to said selected pointer information and a request for full information in connection with both said selected pointer information and said non-requested dummy pointer information.

43. The retrieval system as claimed in claim 22, wherein said retrieval server further comprises a retrieval program storing unit for storing said retrieval program.

44. The retrieval system as claimed in claim 22, wherein:
said retrieval server further comprises a pointer information generating unit for generating pointer information in connection with said first retrieved information;
said retrieval information providing unit is configured to provide said retrieval device with said generated pointer information; and
said retrieval device is configured to retrieve condition-matched pointer information from said provided pointer information.

45. A retrieval method for retrieving information from a retrieval server, which provides retrieval service, by a retrieval device accessible through a transmission medium to said retrieval server, said method comprising:
modifying a first retrieval condition having a first scale into a second retrieval condition having a second scale which includes said first scale and which is greater than said first scale;
transmitting said second retrieval condition to said retrieval server to allow said retrieval server to retrieve first retrieved information which is matched to said second retrieval condition;
retrieving second retrieved information from said first retrieved information retrieved by said retrieval server, said second retrieved information being matched to said first retrieval condition, so that said second retrieved information has a lesser scale than does said first retrieved information;
generating pointer information in connection with said first retrieved information; and
retrieving condition-matched pointer information, which is matched to said first retrieval condition, from said generated pointer information,
wherein said first retrieval condition comprises a first factor in connection with a user's privacy-related information,
wherein said first retrieval condition comprises a second factor corresponding to said first factor, and
wherein said second factor has a greater scale than said first factor.

46. The retrieval method as claimed in claim 45, wherein said first retrieval condition is modified into said second retrieval condition in accordance with a predetermined degree of indistinctness for each kind of factor of said second retrieval condition and a predetermined procedure for modifying said first retrieval condition into said second retrieval condition.

47. The retrieval method as claimed in claim 45, wherein said first retrieval condition is modified into said second retrieval condition in accordance with a user-designated degree of indistinctness for each kind of factor of said second retrieval condition, and a user-designated procedure for modifying said first retrieval condition into said second retrieval condition.

48. The retrieval method as claimed in claim 45, wherein said first retrieval condition has been previously entered by a user, and is fetched from a memory and modified into said second retrieval condition upon receipt of a retrieval request.

49. The retrieval method as claimed in claim 45, wherein each factor of said second retrieval condition is selectively deleted upon receipt of a user's instruction.

50. The retrieval method as claimed in claim 49, further comprising:
updating said first retrieved information by verifying whether said first retrieved information includes any content in connection with said first retrieval condition.

51. The retrieval method as claimed in claim 50, wherein said first retrieved information is updated upon receipt of a retrieval request.

52. The retrieval method as claimed in claim 50, wherein said first retrieved information is updated automatically and periodically.

53. A retrieval method for retrieving information from a retrieval server, which provides retrieval service, by a retrieval device accessible through a transmission medium to said retrieval server, said method comprising:
modifying a first retrieval condition having a first scale into a second retrieval condition having a second scale which includes said first scale and which is greater than said first scale;
transmitting said second retrieval condition to said retrieval server to allow said retrieval server to retrieve first retrieved information which is matched to said second retrieval condition;
retrieving second retrieved information from said first retrieved information retrieved by said retrieval server, said second retrieved information being matched to said first retrieval condition, so that said second retrieved information has a lesser scale than does said first retrieved information;

updating said first retrieved information by verifying whether said first retrieved information includes any content in connection with said first retrieval condition;

making a prediction of said first retrieval condition to be entered by the user in the future, for generating a predicted retrieval condition in connection with said first retrieval condition; and modifying said predicted retrieval condition into said second retrieval conditions wherein said first retrieval condition comprises a first factor in connection with a user's privacy-related information, wherein said first retrieval condition comprises a second factor corresponding to said first factor, wherein said second factor has a greater scale than said first factor, wherein each factor of said second retrieval condition is selectively deleted upon receipt of a user's instruction.

54. A retrieval method for retrieving information from a retrieval server, which provides retrieval service, by a retrieval device accessible through a transmission medium to said retrieval server, said method comprising:

modifying a first retrieval condition having a first scale into a second retrieval condition having a second scale which includes said first scale and which is greater than said first scale;

transmitting said second retrieval condition to said retrieval server to allow said retrieval server to retrieve first retrieved information which is matched to said second retrieval condition;

retrieving second retrieved information from said first retrieved information retrieved by said retrieval server, said second retrieved information being matched to said first retrieval condition, so that said second retrieved information has a lesser scale than does said first retrieved information;

updating said first retrieved information by verifying whether said first retrieved information includes any content in connection with said first retrieval condition;

transmitting contents of said first retrieved information to said retrieval server in addition to said first retrieval condition;

receiving differential information in connection with said first retrieved information from said retrieval server; and updating said first retrieved information based on said differential information, wherein said first retrieval condition comprises a first factor in connection with a user's privacy-related information, wherein said first retrieval condition comprises a second factor corresponding to said first factor, wherein said second factor has a greater scale than said first factor, wherein each factor of said second retrieval condition is selectively deleted upon receipt of a user's instruction.

55. The retrieval method as claimed in claim 45, wherein said second retrieved information is retrieved in accordance with a retrieval program.

56. The retrieval method as claimed in claim 45, further comprising:

receiving retrieval program data, including a retrieval program, from a retrieval program server separately from said first retrieved information; and retrieving said second retrieved information in accordance with said retrieval program.

57. The retrieval method as claimed in claim 45, further comprising:

selecting pointer information from said retrieved pointer information in accordance with a user's instruction; and transmitting, to said retrieval server, said selected pointer information and a request for full information in connection with said selected pointer information.

58. The retrieval method as claimed in claim 57, further comprising:

transmitting, to said retrieval server, an item of non-requested dummy pointer information, in addition to said selected pointer information, and a request for full information in connection with both said selected pointer information and said non-requested dummy pointer information.

59. The retrieval method as claimed in claim 45, further comprising:

selecting pointer information from said retrieved pointer information in accordance with a user's instruction; and transmitting, to a server other than said retrieval server, said selected pointer information and a request for full information in connection with said selected pointer information, where said other server maintains said full information in connection with said selected pointer information.

60. The retrieval method as claimed in claim 59, further comprising:

transmitting, to said other server, an item of non-requested dummy pointer information, in addition to said selected pointer information, and a request for full information in connection with both said selected pointer information and said non-requested dummy pointer information.

61. A machine-readable medium having stored thereon a computer program to be executed by a computer for implementing the retrieval method of claim 45.

* * * * *